(12) United States Patent
Kirazci et al.

(10) Patent No.: US 10,224,031 B2
(45) Date of Patent: Mar. 5, 2019

(54) GENERATING AND TRANSMITTING INVOCATION REQUEST TO APPROPRIATE THIRD-PARTY AGENT

(71) Applicant: Google Inc., Mountain View, CA (US)

(72) Inventors: Ulas Kirazci, Mountain View, CA (US); Bo Wang, San Jose, CA (US); Steve Chen, Los Altos, CA (US); Sunil Vemuri, Pleasanton, CA (US); Barnaby James, Los Gatos, CA (US); Valerie Nygaard, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 47 days.

(21) Appl. No.: 15/394,872

(22) Filed: Dec. 30, 2016

(65) Prior Publication Data

US 2018/0190274 A1 Jul. 5, 2018

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G06F 17/2785* (2013.01);
(Continued)

(58) Field of Classification Search
CPC ................................. G10L 15/22; G06F 3/167
See application file for complete search history.

(56) References Cited

U.S. PATENT DOCUMENTS 8,849,675 B1 * 9/2014 Foerster ................. G10L 15/22
 704/251
9,009,046 B1 * 4/2015 Stewart ................... G10L 15/18
 704/251
(Continued)

FOREIGN PATENT DOCUMENTS

CA 2747153 1/2013
WO 2013137660 9/2013
(Continued)

OTHER PUBLICATIONS

European Patent Office—International Searching Authority; Notification of Transmittal of the International Search Report and the Written Opinion of PCT Serial No. PCT/US2017/053832; dated Nov. 28, 2017.

(Continued)

*Primary Examiner* — Samuel G Neway
(74) *Attorney, Agent, or Firm* — Middleton Reutlinger

(57) ABSTRACT

Some implementations are directed to selective invocation of a particular third-party (3P) agent by an automated assistant to achieve an intended action determined by the automated assistant during a dynamic dialog between the automated assistant and a user. In some of those implementations, the particular 3P agent is invoked with value(s) for parameter(s) that are determined during the dynamic dialog; and/or the particular 3P agent is selected, from a plurality of candidate 3P agents, for invocation based on the determined value(s) for the parameter(s) and/or based on other criteria. In some of those implementations, the automated assistant invokes the particular 3P agent by transmitting, to the particular 3P agent, a 3P invocation request that includes the determined value(s) for the parameter(s).

18 Claims, 9 Drawing Sheets

(51) Int. Cl.
*G06F 17/27* (2006.01)
*G06F 17/30* (2006.01)
*G10L 15/18* (2013.01)
*G10L 15/30* (2013.01)

(52) U.S. Cl.
CPC .... *G06F 17/30867* (2013.01); *G10L 15/1815* (2013.01); *G10L 15/1822* (2013.01); *G10L 15/30* (2013.01); *G10L 2015/223* (2013.01)

(56) References Cited

U.S. PATENT DOCUMENTS

| 9,218,819 | B1* | 12/2015 | Stekkelpak | G10L 15/22 |
| 2013/0173251 | A1 | 7/2013 | Xiong et al. | |
| 2013/0275164 | A1* | 10/2013 | Gruber | G10L 17/22 |
| | | | | 705/5 |
| 2013/0283168 | A1* | 10/2013 | Brown | G06F 3/165 |
| | | | | 715/728 |
| 2013/0311997 | A1* | 11/2013 | Gruber | G06Q 10/10 |
| | | | | 718/102 |
| 2014/0250106 | A1* | 9/2014 | Shapira | G06F 17/30864 |
| | | | | 707/722 |
| 2014/0310001 | A1 | 10/2014 | Kalns et al. | |
| 2015/0088523 | A1* | 3/2015 | Schuster | G10L 15/22 |
| | | | | 704/275 |
| 2016/0035353 | A1* | 2/2016 | Chen | G10L 17/22 |
| | | | | 704/235 |
| 2016/0189717 | A1* | 6/2016 | Kannan | G10L 17/22 |
| | | | | 704/275 |
| 2017/0346949 | A1* | 11/2017 | Sanghavi | H04M 3/5183 |

FOREIGN PATENT DOCUMENTS

| WO | 2014197635 | 12/2014 |
| WO | 20160154000 | 9/2016 |

OTHER PUBLICATIONS

United Kingdom Intellectual Property Office; Combined Search and Examination Report issued in Application No. 1715691.0 dated Mar. 9, 2018.
Irish Patent Office; Search Report and Written Opinion issued in Application No. 2017/0203 dated Apr. 12, 2018.
European Patent Office; Written Opinion of the International Preliminary Examining Authority of PCT Ser. No. PCT/US2017/053832; 11 pages; dated Dec. 17, 2018.

* cited by examiner

GENERATING AND TRANSMITTING INVOCATION REQUEST TO APPROPRIATE THIRD-PARTY AGENT

BACKGROUND

An automated assistant (also known as "personal assistant", "mobile assistant", or "chat bot") may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output). An automated assistant interacted with via a client device may be implemented via the client device itself and/or via one or more remote computing devices that are in network communication with the client device (e.g., computing device(s) in "the cloud").

SUMMARY

This specification is directed generally to selectively invoking third-party (3P) agents. Some implementations are directed to selective invocation of a particular 3P agent by an automated assistant to achieve an intended action determined by the automated assistant during a dynamic dialog between the automated assistant and a user. In some of those implementations, the particular 3P agent is invoked with value(s) for parameter(s) that are determined during the dynamic dialog; and/or the particular 3P agent is selected, from a plurality of candidate 3P agents, for invocation based on the determined value(s) for the parameter(s) and/or based on other criteria. In some versions of those implementations, the automated assistant invokes the particular 3P agent by transmitting, to the particular 3P agent, a 3P invocation request that includes the determined value(s) for the parameter(s). For example, the automated assistant may transmit the 3P invocation request to the 3P agent over one or more networks and may interface with the 3P agent utilizing an application programming interface (API).

When the particular 3P agent is invoked, the particular 3P agent generates 3P responsive content that can be used to generate output for inclusion in the dynamic dialog. When the invocation request includes the determined value(s) for the parameter(s), the particular 3P agent may take those value(s) into account in generating the 3P responsive content. This may enable the intended action to be achieved via the particular 3P agent more quickly, which may conserve various computational resources (e.g., network traffic consumed by additional "turns" that might be necessary absent the provision of the value(s)).

Moreover, when the determined value(s) for the parameter(s) are utilized to select the particular 3P agent, it may ensure that the selected particular 3P agent is able to perform the intended action based on the determined values. For example, determined value(s) for parameter(s) may be compared to corresponding value(s) for the parameter(s) defined for each of a plurality of candidate 3P agents that can perform the intended action—and only the 3P agent(s) whose value(s) correspond to the determined value(s) can be considered for selection. This may mitigate the risk that the particular 3P agent selected for invocation is unable to perform the intended action, which may conserve various computational resources. For example, it may conserve network and/or processor resources that may otherwise be consumed by an initial failed attempt to utilize a 3P agent to perform the intended action, that is then followed by invoking an alternative 3P agent in another attempt to perform the intended action.

In some situations, in response to invocation of the particular 3P agent, value(s) for parameter(s) that are provided with an invocation request may enable the particular 3P agent to achieve the intended action without engaging in further dialog with the user. In those situations, the 3P agent may provide responsive content that indicates the intended action has been achieved and/or that indicates additional information related to achievement of the intended action.

In some situations, in response to invocation of the particular 3P agent, the dynamic dialog may be at least temporarily transferred (actually or effectively) to the particular 3P agent, such that the 3P agent at least temporarily "steers" the substance of the dynamic dialog. For example, output that is based on the 3P responsive content may be provided to the user in furtherance of the dialog, and further user input received in response to the 3P responsive content. The further user input (or a conversion thereof) may be provided to the particular 3P agent. The particular 3P agent may utilize its own semantic engines and/or other components in generating further responsive content that can be used to generate further output for providing in furtherance of the dynamic dialog. This general process may continue until, for example, the 3P agent provides responsive content that terminates the 3P agent dialog (e.g., an answer or resolution instead of a prompt), additional user interface input of the user terminates the 3P agent dialog (e.g., instead invokes a response from the automated assistant or another 3P agent), etc.

As described herein, in some situations the automated assistant may still serve as an intermediary when the dialog is effectively transferred to the 3P agent. For example, in serving as an intermediary where natural language input of a user is voice input, the automated assistant may convert that voice input to text, provide the text (and optionally annotations of the text) to the 3P agent, receive 3P responsive content from the 3P agent, and provide output that is based on the 3P responsive content for presentation to the user. Also, for example, in serving as an intermediary, the automated assistant may analyze user input and/or 3P responsive content to determine if dialog with the 3P agent should be terminated, transferred to an alternate 3P agent, etc. As also described herein, in some situations the dialog may be actually transferred to the 3P agent (without the automated assistant serving as an intermediary once transferred), and transferred back to the automated assistant upon occurrence of one or more conditions such as termination by the 3P agent (e.g., in response to completion of an intended action via the 3P agent).

Implementations described herein enable an automated assistant to select an appropriate 3P agent based on dialog with a user, and invoke the 3P agent to achieve an intended action of the user that is indicated by the user in the dialog. These implementations may enable a user to engage a 3P agent via interaction with an automated assistant, without necessitating the user know "hot words" to explicitly trigger the 3P agent and/or without necessitating the user even initially know the 3P agent exists. Moreover, implementations enable the automated assistant to determine, based on the dialog with the user, values for various parameters (associated with the intended action), and to pass those parameters to the 3P agent in conjunction with invoking the 3P agent. Moreover, these implementations may enable the user to utilize a common automated assistant interface (e.g., an audible/voice-based interface and/or graphical interface)

to interact with any of a plurality of disparate 3P agents that enable performance of actions across a plurality of disparate service sectors. For example, the common automated assistant interface may be utilized to engage any one of a plurality of 3P agents that perform intended action(s) in a "restaurant reservation" service sector, engage any one of a plurality of 3P agents that perform intended action(s) in a "purchasing professional services" service sector, engage any one of a plurality of 3P agents that perform intended action(s) in a "purchasing travel services" service sector, and engage any one of a plurality of 3P agents that perform intended action(s) in an "interactive game" service sector.

As used herein, a 3P agent references one or more computing devices and/or associated software managed by a party that is separate from a party that manages an automated assistant. The 3P agent is configured to receive (e.g., over a network via an API) content from the automated assistant. In response to receiving the content, the 3P agent generates 3P responsive content based on the received content, and transmits the 3P responsive content for the provision of output that is based on the 3P responsive content. For example, the 3P agent may transmit the 3P responsive content to the automated assistant for provision of output, by the automated assistant, that is based on the 3P responsive content. A 3P agent may often be configured to perform one or more particularized intended actions such as, for example: booking a restaurant reservation; ordering food; purchasing movie tickets; purchasing services; requesting services (e.g., transportation); managing text, email, or other electronic communications of a user; providing guidance for a task of a user (e.g., mixing a drink, fixing a leaky faucet); engaging in an interactive game with a user; etc.

Various types of input are described herein that may be provided by a user, via user interface input device(s), to an automated assistant and/or to a 3P agent. In some instances the input may be natural language input that is free-form, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

In some implementations, a method performed by one or more processors is provided and includes: receiving natural language input of a user that is directed to an automated assistant as part of a dynamic dialog between the user and the automated assistant. The natural language input is free-form and based on user interface input provided by the user via a user interface input device. The method further includes selecting an intended action based on determining that the natural language input indicates the intended action. The intended action is selected from a group of potential intended actions that are available via the automated assistant and that span multiple service sectors. The method further includes determining that at least one mandatory parameter stored in association with the intended action is unspecified in the natural language input. The method further includes, in response to determining that the at least one mandatory parameter is unspecified, generating a prompt that is based on the at least one mandatory parameter. The method further includes: providing the prompt as part of the dynamic dialog and as a reply to the natural language input; receiving additional natural language input provided by the user as part of the dynamic dialog in response to the prompt; determining a value for the mandatory parameter based on the additional natural language input; and selecting a particular third-party agent from a group of third-party agents that can each perform the intended action indicated by the natural language input. The method further includes transmitting a third-party invocation request that includes the value for the mandatory parameter. The transmitting is to the particular third-party agent via one or more network interfaces and occurs without any other third-party invocation request transmission to any other third-party agents of the group of third-party agents. In some implementations, the method further includes: receiving, via one or more of the network interfaces, responsive content from the third-party agent in response to the transmitting the third-party invocation request; and providing, for presentation to the user as part of the dynamic dialog, output that is based on the responsive content.

These and other implementations of technology disclosed herein may optionally include one or more of the following features.

In some implementations, the method further includes: receiving further input provided by the user in response to the output that is based on the responsive content of the third-party agent; and transmitting, to the third-party agent via one or more of the network interfaces, content that is based on the further input. In some of those implementations, the further input is voice input and the method further includes converting the voice input to text and including at least some of the text in the content. In some versions of those implementations, the method further includes: receiving, via one or more of the network interfaces, further responsive content from the third-party agent in response to transmitting the content; and providing, for presentation to the user as part of the dynamic dialog, further output that is based on the further responsive content.

In some implementations, the method further includes: receiving further input provided by the user in response to the output that is based on the responsive content of the third-party agent; determining whether the further input indicates a desire to cease interaction with the third-party agent; and in response to determining that the further input does not indicate a desire to cease interaction with the third-party agent: transmitting, to the third-party agent via one or more of the network interfaces, content that is based on the further input.

In some implementations, the method further includes: receiving further input provided by the user in response to either the output or further output that is based on content provided by the third-party agent; determining that the further input indicates a desire to interact with another third-party agent; and in response to determining that the further input indicates a desire to interact with another third-party agent: transmitting, to an alternative third-party agent of the group of third party agents, an additional third-party invocation request that includes the value for the mandatory parameter. In some of those implementations, the method further includes: determining an additional value for an additional parameter of the intended action based on user input during engagement of the third-party agent in the dynamic dialog; and including the additional value for the additional parameter in the additional third-party invocation request.

In some implementations, the method further includes: determining an additional value for a non-solicited optional parameter of the intended action based on the natural language input or the additional natural language input; and including the additional value for the additional parameter in the third-party invocation request. In some of those implementations, selecting the particular third-party agent from the group of third-party agents includes: selecting the particular third-party agent based on the value and the additional value conforming to corresponding values defined, for the third-party agent, for the mandatory parameter and the additional parameter. In some versions of those implementations, selecting the particular third-party agent from the group of third-party agents further includes: eliminating an additional third-party agent from the selecting based on the value and the additional value not conforming to corresponding values defined, for the additional third-party agent, for the mandatory parameter and the additional parameter. The additional third-party agent is of the group of third-party agents. Selecting the particular third-party agent may in some of those implementations occur without providing the user with output that explicitly solicits the user to select between the third-party agent and one or more additional third-party agents of the group.

In some implementations, a method performed by one or more processors is provided and includes, as part of a dynamic dialog between a user and an automated assistant implemented by one or more of the processors: receiving natural language input of a user that is directed to the automated assistant as part of the dynamic dialog, the natural language input being free-form and being based on user interface input provided by the user via a user interface input device; selecting an intended action based on determining that the natural language input indicates the intended action, the intended action being selected from a group of potential intended actions that span multiple service sectors; identifying a group of third-party agents that can each perform the intended action indicated by the natural language input and that can each perform the intended action; generating a prompt that is based on a parameter that is stored in association with the intended action and that is unspecified in the natural language input, where the prompt does not explicitly identify any of the third-party agents of the group; providing the prompt as part of the dynamic dialog and as a reply to the natural language input; receiving additional natural language input provided by the user as part of the dynamic dialog in response to the prompt; determining a value for the parameter based on the additional natural language input; eliminating a third-party agent from the group of third-party agents to form a subgroup, the eliminating based on the value not conforming to a corresponding value defined for the parameter for the third-party agent; selecting a particular third-party agent from the subgroup; and transmitting a third-party invocation request that includes the value for the parameter. The transmitting is to only the selected particular third-party agent via one or more network interfaces.

These and other implementations of technology disclosed herein may optionally include one or more of the following features.

In some implementations, the method further includes: receiving, via one or more of the network interfaces, responsive content from the third-party agent in response to the transmitting the third-party invocation request; and providing, for presentation to the user as part of the dynamic dialog, output that is based on the responsive content. In some of those implementations, the method further includes: receiving further input provided by the user in response to the output that is based on the responsive content of the third-party agent; and transmitting, to the third-party agent via one or more of the network interfaces, content that is based on the further input. In some of those implementations, the further input is voice input and the method further includes: converting the voice input to text and including at least some of the text in the content In some implementations, a method performed by one or more processors is provided and includes: receiving, by a local agent over one or more network interfaces, first natural language input transmitted by a client device of a user. The first natural language input is free-form and is directed to an automated assistant interface implemented by the client device. The method further includes determining, by the local agent, that the first natural language input indicates a first intended action that is directed to a first service sector. The method further includes, by the local agent via one or more of the network interfaces: interacting with the user via the automated assistant interface of the client device to resolve values for all first mandatory parameters stored in association with the first intended action. The method further includes selecting, by the local agent, a particular third-party agent from a group of third-party agents that can each perform the intended action indicated by the first natural language input. The method further includes, by the local agent subsequent to resolving the values for the first mandatory parameters: invoking the third-party agent based on the resolved values for the first mandatory parameters; and facilitating interactions between the client device and the third-party agent that occur via the automated assistant interface, and that are steered by the third-party agent.

In some implementations, the method further includes: receiving, by the local agent over one or more of the network interfaces, second natural language input from the client device of a user, the second natural language input being free-form and being directed to the automated assistant interface; determining, by the local agent, that the second free-form natural language input indicates a second intended action that is directed to a second service sector, the second service sector being disparate from the first service sector; by the local agent via one or more of the network interfaces, interacting with the user via the automated assistant interface of the client device to resolve second values for all second mandatory parameters stored in association with the second intended action; selecting, by the local agent, an additional particular third-party agent from a group of additional third-party agents that can each perform the second intended action indicated by the natural language input, the group of additional third-party agents being disparate from the group of third-party agents; and by the local agent subsequent to resolving the second values for the second mandatory parameters: invoking the additional third-party agent based on the resolved second values for the second mandatory parameters, and facilitating interactions between the client device and the additional third-party agent that occur via the automated assistant interface, and that are steered by the additional third-party agent.

In some implementations, a method performed by one or more processors is provided and includes: receiving an initial voice input provided by a user via a client device; performing a voice to text conversion to convert the initial voice input to initial text; determining an intended action based on the initial text; identifying a mandatory parameter that is stored as mandatory for the intended action; determining that the initial text lacks specification of any value for the mandatory parameter; in response to determining that the initial text lacks specification of any value for the mandatory parameter: generating a natural language prompt based on the mandatory parameter, and providing the natural language prompt as a reply to the initial voice input, the prompt being provided for presentation to the user via a user interface output device of the client device; receiving additional natural language input provided by the user in response to providing the natural language prompt; determining a value for the parameter based on the additional natural language input; selecting a particular third-party agent of a group of third-party agents that can perform the intended action; transmitting a third-party invocation request that includes the value for the mandatory parameter, where the transmitting is to the particular third-party agent via one or more network interfaces; receiving responsive content from the third-party agent in response to transmitting the intended action and the value, the receiving being via one or more of the network interfaces; and providing output that is based on the responsive content for presentation to the user; receiving further additional natural language input provided by the user in response to providing the output; performing an additional voice to text conversion to convert the further additional natural language input to further text; and transmitting the further text to the particular third-party agent.

In some implementations, a method performed by one or more processors is provided and includes: receiving, via one or more network interfaces, input transmitted by a client device, the input being free-form natural language user input; determining an intended action based on the input; identifying a mandatory parameter that is stored as mandatory for the intended action; determining that the input lacks specification of any value for the mandatory parameter; in response to determining that the initial text lacks specification of any value for the mandatory parameter: generating a prompt that is based on the mandatory parameter and that does not solicit input on an optional parameter stored as optional for the intended action, and transmitting, to the client device, the natural language prompt as a reply to the input; receiving, via one or more of the network interfaces, additional input transmitted by the client device in response to the prompt, the additional input being free-form natural language user input; determining a value for the parameter based on the additional natural language input; determining an additional value for the optional parameter based on the additional natural language input; selecting a particular third-party agent that can perform the intended action based on both the value and the additional value; and transmitting a third-party invocation request that includes both the value and the additional value. The transmitting is to the particular third-party agent via one or more of the network interfaces.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
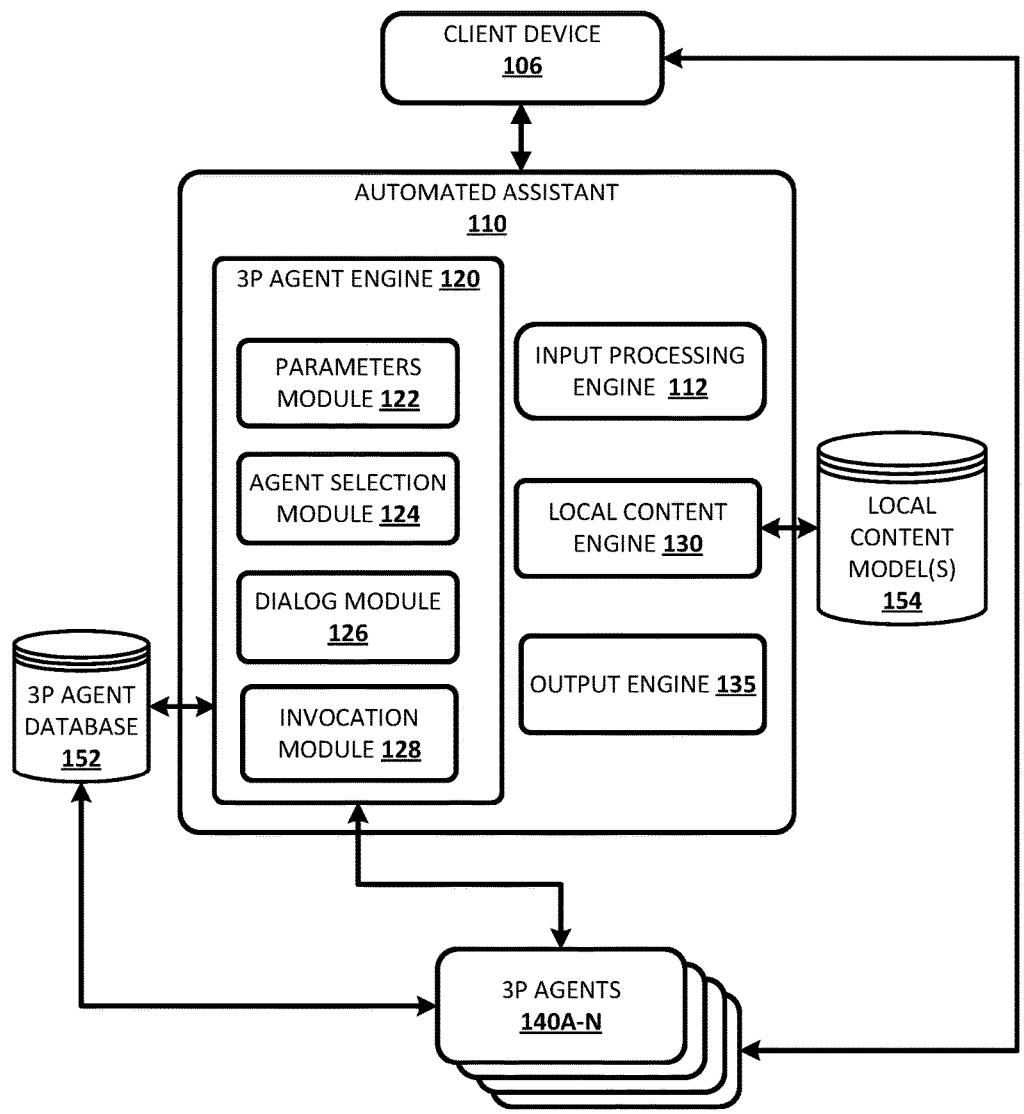
FIG. 1 is a block diagram of an example environment in which implementations disclosed herein may be implemented.

In some situations, in order to invoke a particular third-party (3P) agent via an automated assistant, a user must provide input that explicitly invokes that particular 3P agent. For example, to invoke a "movie ticket purchase" 3P agent named "Hypothetical Agent", the user must know to speak a "hot word/phrase" for the 3P agent such as "Order tickets with Hypothetical Agent". Such explicit invocations require the user to know at the outset which 3P agent is most appropriate for an intended action of the user, and sends the user directly to that 3P agent for attempted resolution of the intended action via interaction with the 3P agent.

However, it may often be the case that the 3P agent directly invoked by the user isn't able to perform the intended action in a manner desired by the user. This may waste user and computational resources as the user must first interact with the 3P agent, determine the 3P agent is not appropriate, then attempt to perform the intended action via interaction with another 3P agent. Moreover, it may often be the case that the user is unaware of the availability of various 3P agents, and for various automated assistant interfaces it may be impractical and/or undesirable to explicitly provide a list of available 3P agents and associated functionality to a user in the often constrained automated assistant interface. For example, some automated assistants are "voice only" and it may be impractical and/or undesirable to "read a list" of 3P agents and associated functionality to the user.

Various implementations enable a user to engage in dialog with an automated assistant, and through that dialog the automated assistant may: determine an intended action of the user; determine value(s) for parameter(s) stored in association with the intended action; select a particular 3P agent that is able to achieve the intended action based on the determined values; and invoke the 3P agent with the determined values. Accordingly, instead of requiring the user start with an explicit invocation of a 3P agent, implementations disclosed herein instead engage in a dialog with a user in advance of invoking any 3P agent, and only invoke a particular 3P agent after determining the particular 3P agent can achieve the intended action with the determined values. These and other implementations may mitigate the waste of human and computational resources that may be encountered when a user explicitly invokes a 3P agent that turns out to be the wrong 3P agent. Moreover, in invoking the 3P agent, the automated assistant may transmit the determined values to the 3P agent and obviate the need for the 3P agent to solicit those values. This may enable the intended action to be achieved via the particular 3P agent more quickly, which may conserve various computational resources (e.g., network traffic consumed by additional "turns" that might be necessary absent the provision of the value(s)).

Invoking a 3P agent, as used herein, may refer to transferring (actually or effectively) an automated assistant dialog to the 3P agent. When the dialog is transferred to the 3P agent, the 3P agent "steers" the substance of the dialog, and the automated assistant only takes over in response to one or more conditions such as termination by the 3P agent, (e.g., in response to completion of an intended action via the 3P agent), termination by the user (e.g., in response to the user providing input that indicates a desire to terminate the 3P agent session), a timeout, etc. Invoking a 3P agent, as used herein, may additionally or alternatively include network communication with the 3P agent to achieve the intended action, without the 3P agent directly steering the dialog. For example, where values for all mandatory parameters of an intended action are determined by the automated assistant, the automated assistant may communicate those values to the 3P agent to cause the 3P agent to perform the intended action, receive 3P responsive content from the 3P agent that indicates the intended action was performed and/or includes details of the performance of the intended action, then may provide output to the user that is based on the received 3P responsive content (e.g., that confirms the intended action was performed).

As one example of the above and other implementations disclosed herein, assume a user desires to perform an intended action of purchasing 2 adult movie tickets to "Movie A". Instead of the user needing to initially specify a 3P agent via which the intended action can be achieved, the user may instead provide natural language input of "Buy 2 movie tickets to Movie A". The automated assistant may parse such input and map the parsed input to an intended action of "buy movie ticket", with a value of "2" for the parameter of "number of adult tickets", and a value of "Movie A" (or associated identifier) for the parameter of "movie name".

The automated assistant may further determine an additional mandatory parameter that is defined (e.g., defined in an API) for the "buy movie ticket" intended action, such as a parameter of "theater location"—and determine that the additional mandatory parameter is not specified by the natural language input. In response, the automated assistant may prompt the user with "what theater", receive a response of "Baxter Avenue", then determine "Baxter Avenue Theater" (or associated identifier) as a value for that parameter.

The automated assistant may further identify candidate 3P agents that can perform the intended action "buy movie ticket" and determine, based on data provided by each of the 3P agents, if each of the 3P agents can achieve that action for the particular determined value(s) for the parameter(s) (e.g., does the 3P agent being considered sell tickets for "Baxter Avenue" and/or have tickets available for "Movie A" for that theatre). The data provided by each of the 3P agents may be static and/or dynamic. When dynamic, the 3P agents may periodically (or at other regular or non-regular interval) provide updated data for consideration by the automated assistant and/or the automated assistant may engage (e.g., over a network via an API) the 3P agents during the course of a dialog to obtain certain live data for consideration. In some situations, the automated assistant may deterministically select one of the 3P agents that can achieve the intended action for the particular determined value(s) (e.g., if it is the only agent, or if it is one of a select few and is strongly preferred by the user)—and transmit an invocation request to the selected 3P agent along with the determined value(s). In some other situations, where multiple 3P agents can achieve the intended action with the particular determined value(s), the automated assistant may present the user with a choice between at least some of those (e.g., "Do you want to use 3P Agent 1 or 3P Agent 2"). In some of those other situations, the automated assistant may additionally or alternatively present the user with value(s) that are specific to the presented 3P agents, and that have not been specified by the user, to help the user select (e.g., price of tickets for each 3P agent, user ratings for each agent). Moreover, in some of those other situations, which 3P agents (of multiple 3P agents that can achieve the intended action with the determined value(s)) are actually selected for presenting to the user as choices may be based on value(s) that are specific to those 3P agents, and that have not been specified by the user. For example, where a value for a price parameter hasn't been specified by the user, it can be utilized. Also, for example, ratings of the user and/or other user(s) for the 3P agents can be utilized.

In some implementations, interactions of a user with the 3P agent and with the automated assistant may occur via a common automated assistant interface. For example, for a voice-based automated assistant interface the interactions with both the automated assistant and the 3P agent may occur via voice-based interaction (although the "voice" of provided output may vary between the two). Also, for example, for a graphical automated assistant interface, the user may stay within the same dialog interface during interactions with both the automated assistant and the 3P agent (although graphical icons and/or other indicia may indicate when the 3P agent is invoked). This may enable the user to interact with a variety of 3P agents and/or to achieve various intended actions across a variety of service sectors, without necessitating the user to switch between multiple interfaces.

Now turning to FIG. 1, an example environment in which techniques disclosed herein may be implemented is illustrated. The example environment includes a client device 106, an automated assistant 110, and a plurality of third-party (3P) agents 140*a-n*. The client device 106 may be, for example, a standalone voice-activated speaker device, a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet).

Although only one client device 106 is illustrated in combination with the automated assistant 110, in many implementations the automated assistant 110 may be remote and may interface with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single device 106.

The automated assistant 110 is separate from the 3P agents 140A-N and communicates with the 3P agents 140A-N via one or more networks, such as a WAN. In many implementations, one or more (e.g., all) of the 3P agents 140A-N are each managed by a respective party that is separate from a party that manages the automated assistant 110.

The 3P agents 140A-N may each provide, directly or indirectly, data for storage in 3P agent database 152. The data for a given 3P agent may define, for example, intended action(s) that can be resolved by the 3P agent. Moreover, the data for a given 3P agent may define, for each intended action, values that can be handled by the 3P agent for a plurality of parameters defined for the intended action(s). In some implementations, the automated assistant 110 and/or other component may define the intended actions, parameters for each of the intended actions, and acceptable values that may be defined for each of the parameters. For example, such criteria may be defined via an API maintained by the automated assistant 110. Each of the 3P agents may then provide (e.g., transmit over a WAN) its intended action(s) and its values for parameters of the intended action to automated assistant 110 and/or other component, which may validate and store the data in 3P agent database 152. In some implementations, one or more of the 3P agents 140A-N may dynamically provide updates to value(s) for various parameter(s) (e.g., in response to inventory changes, changes to functionality, changes to service offerings). Also, in some implementations, the automated assistant 110 may additionally or alternatively perform live requests for various value(s) from one or more of the 3P agents 140A-N in addition to, or in lieu of, obtaining values from the 3P agent database 152.

As one example, for a "restaurant reservation" intended action, mandatory parameters may be defined such as "number of people", "location", and "time". A 3P agent may provide data that indicates available values for those mandatory parameters for which it can perform a "restaurant reservation action". For example, it can provide values that indicate each of the locations it services and, for each of those locations, also provide values indicating if it can currently service intended actions for particular numbers of people (e.g., specific quantities and/or ranges of quantities) and/or times (e.g., specific times and/or ranges of times). Also, for example, for the "restaurant reservation" intended action, optional parameters may be defined such as "table type preference" (e.g., booth, table, high top), "seating location preference" (e.g., indoor, outdoor, window), etc. A 3P agent may likewise provide data that indicates available values (if any) for these optional parameters, with one or more of the values optionally being dependent on other optional and/or mandatory values. For instance, the 3P agent may provide data that indicates whether it can service an intended action with a "table type preference" and/or that indicates what table types are available (optionally paired with values for times, number of people, and/or values for other parameters). As another example, for a "vehicular transportation" intended action, mandatory parameters may be defined such as "originating location" and "departure time" and optional parameters may be defined such as "destination location", "car size", "price", etc. A 3P agent may provide data that indicates available values for those mandatory and optional parameters for which it can perform a "vehicular transportation" intended action. For example, it can provide values that indicate geographic regions it services as values for "origination location" and "destination location" parameters.

Intended actions that can be indicated by a 3P agent may span a variety of disparate service sectors. As used herein, a service sector is a coarse grained sector of services which itself may have several more finely grained subsectors. For example, "travel" is a service sector which itself has several subsectors such as air travel, car travel, train travel, lodging, etc. Also, for example, "interactive game" is a service sector which itself has several subsectors such as "trivia games", "role playing games", etc. Accordingly, the intended actions performable by the 3P agents 140A-N and that can be invoked by the automated assistant 110 may be from any one of a large number (e.g., 10+) coarse grained service sectors.

The automated assistant 110 includes an input processing engine 112, a local content engine 130, a 3P agent engine 120, and an output engine 135. In some implementations, one or more of the engines of automated assistant 110 may be omitted, combined, and/or implemented in a component that is separate from automated assistant 110. Moreover, automated assistant 110 may include additional engines not illustrated herein for the sake of simplicity.

The automated assistant 110 receives instances of user input from the client device 106. For example, the automated assistant 110 may receive free-form natural language voice input in the form of a streaming audio recording. The streaming audio recording may be generated by the client device 106 in response to signals received from a microphone of the client device 106 that captures spoken input of a user of the client device 106. As another example, the automated assistant 110 may receive free-form natural language typed input and/or even structured (non-free-form) input in some implementations. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input.

The automated assistant 110 provides an instance of output in response to receiving an instance of user input from the client device 106. The instance of output may be, for example, audio to be audibly presented by the device 106 (e.g., output via a speaker of the client device 106), text and/or graphical content to be graphically presented by the device 106 (e.g., rendered via a display of the client device 106), etc. As described herein, some instances of the output may be based on local responsive content generated by the automated assistant 110 (optionally utilizing one or more external components also managed by the same entity that manages the automated assistant 110), while other instances of the output may be based on 3P responsive content generated by a selected one of the 3P agents 140A-N.

The input processing engine 112 of automated assistant 110 processes natural language input and/or other user input received via client devices 106 and generates annotated output for use by one or more other components of the automated assistant 110, such as local content engine 130 and/or 3P agent engine 120. For example, the input processing engine 112 may process natural language free-form input that is generated by a user via one or more user interface input devices of client device 106. The generated annotated output includes one or more annotations of the natural language input and optionally one or more (e.g., all) of the terms of the natural language input. As another example, the input processing engine 112 may additionally or alternatively include a voice to text module that receives an instance of voice input (e.g., in the form of digital audio data), and converts the voice input into text that includes one or more text words or phrases. In some implementations, the voice to text module is a streaming voice to text engine. The voice to text module may rely on one or more stored voice to text models (also referred to as language models) that each may model a relationship between an audio signal and phonetic units in a language, along with word sequences in the language.

In some implementations, the input processing engine 112 is configured to identify and annotate various types of grammatical information in natural language input (e.g., typed input and/or text converted from audio input). For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the input processing engine 112 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity to resolve a particular entity.

In some implementations, the input processing engine 112 may additionally and/or alternatively include a coreference resolver configured to group, or "cluster," references to the same entity based on one or more contextual cues. For example, the coreference resolver may be utilized to resolve the term "it" in an instance of user input to a preceding mention of "Movie A" in an immediately preceding instance of user input.

In some implementations, one or more components of the input processing engine 112 may rely on annotations from one or more other components of the input processing engine 112. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the input processing engine 112 may use related prior input and/or other related data outside of the particular natural language input to determine one or more annotations.

The input processing engine 112 may attempt to discern the semantics or meaning of user input and provide semantic indications of the user input to local content engine 130 and/or 3P agent engine 120 for use by those engines. The input processing engine 112 may rely on one or more stored grammar models to map text (or other input) to particular actions and to identify attributes that constrain the performance of such actions, e.g., input variables to such actions.

The local content engine 130 may generate a response to received user input when that user input is associated with a "local action" (as opposed to a 3P agent action). In some implementations, the input processing engine 112 determines whether the user input is associated with a local action or a 3P agent intended action. The local content engine 130 may work in conjunction with the input processing engine 112 and perform one or more actions as dictated by parsed text (e.g., action(s) and action parameter(s)) provided by the input processing engine 112. For local actions, the local content engine 130 may generate local responsive content and provide that local responsive content to the output engine 135 for providing corresponding output for presentation to a user via the device 106. The local content engine 130 may utilize one or more stored local content models 154 for generating local content and/or performing other actions. The content models 154 may, for example, incorporate various rules for creating local responsive content. In some implementations, the local content engine 130 may communicate with one or more other "local" components in generating local responsive content, such as search engine that is managed by the entity that manages the automated assistant 110.

The output engine 135 provides instances of output to the client device 106. An instance of output may be based on local responsive content (from local content engine 130) and/or 3P responsive content (e.g., from one of the 3P agents 140A-N when the automated assistant 110 acts as an intermediary). In some implementations, the output engine 135 may include a text to speech engine that converts textual components of responsive content to an audio format, and the output provided by the output engine 135 is in an audio format (e.g., as streaming audio). In some implementations, the responsive content may already be in an audio format. In some implementations, the output engine 135 additionally or alternatively provides textual reply content as output (optionally for conversion by the device 106 to audio) and/or provides other graphical content as output for graphical display by the client device 106.

The 3P agent engine 120 includes parameters module 122, an agent selection module 124, a dialog module 126, and an invocation module 128. In some implementations, module(s) of 3P agent engine 120 may be omitted, combined, and/or implemented in a component that is separate from the 3P agent engine 120. Moreover, 3P agent engine 120 may include additional modules not illustrated herein for the sake of simplicity.

When user input provided by client device 106 is associated with a 3P intended action, the parameters module 122 may determine whether that user input includes value(s) for any parameters that are stored in association with that intended action (e.g., stored in database 152) and, if so, store those values in association with the intended action of the user. The parameters module 122 may further interact with the dialog module 126 to generate prompt(s) to solicit further user input related to any unspecified mandatory parameters for the intended action. Any prompt(s) generated by the dialog module 126 may be provided for presentation to the user by the output engine 135 and further responsive user input received. The further user input(s) may each be analyzed by the parameters module 122 (optionally as annotated by input processing engine 112) to determine whether those inputs include value(s) for parameter(s) and, if so, store those values in association with the intended action of the user.

The agent selection module 124 utilizes value(s) determined by the parameters module 122 to select, from a group of 3P agents stored (e.g., in database 152) in association with the intended action, a particular 3P agent to utilize in performance of the intended action. The agent selection module 124 may additionally or alternatively utilize other criteria in selecting the particular 3P agent and may optionally interact with the dialog module 126 to generate prompt(s) to solicit further user input in selecting a 3P agent. Any prompt(s) generated by the dialog module 126 may be provided for presentation to the user by the output engine 135 and further responsive user input received. The further user input(s) may each be analyzed by the agent selection module 124 (optionally as annotated by input processing engine 112) to determine a particular 3P agent.

In generating prompts in interacting with the parameters module 122 and/or agent selection module 124, the dialog module 126 may utilize properties of parameters and/or 3P agents being sought by those modules. Moreover, the dialog module 126 may utilize one or more grammar models, rules, and/or annotations from input processing engine 112 in generating prompts and interacting with a user via the client device 106.

The invocation module 128 transmits, to a particular 3P agent of 3P agents 140A-N selected by agent selection module 124, an invocation request that includes optional and/or mandatory parameters determined by the parameters module 122. The transmitted invocation request invokes the particular 3P agent. Invoking a 3P agent, as used herein, may refer to transferring (actually or effectively) to the 3P agent, the dialog between the user of the client device 106 and the automated assistant 110. Invoking a 3P agent may additionally or alternatively include network communication of the automated assistant 110 with the 3P agent to achieve the intended action, without the 3P agent directly steering the dialog.

As described herein, in some situations the automated assistant 110 may still serve as an intermediary when the dialog is effectively transferred to the particular 3P agent. For example, in serving as an intermediary where natural language input of a user is voice input: the input processing engine 112 of the automated assistant 110 may convert that voice input to text; the automated assistant 110 may transmit the text (and optionally annotations of the text from input processing engine 112) to the 3P agent, and receive 3P responsive content from the 3P agent; and the output engine 135 may provide output that is based on the 3P responsive content for presentation to the user via the client device 106. Also, for example, in serving as an intermediary, the automated assistant 110 may additionally or alternatively analyze user input and/or 3P responsive content to determine if dialog with the 3P agent should be terminated, transferred to an alternate 3P agent, etc. As also described herein, in some situations the dialog may be actually transferred to the 3P agent (without the automated assistant 110 serving as an intermediary once transferred), and transferred back to the automated assistant 110 upon occurrence of one or more conditions.

Each of the 3P agents 140A-N may include a 3P contextual parameters engine, a 3P content engine, and/or other engines. Moreover, in many implementations a 3P agent may access various stored models and/or other resources (e.g., its own grammar model(s) and/or content model(s)) in generating 3P responsive content.

Figure 2A:
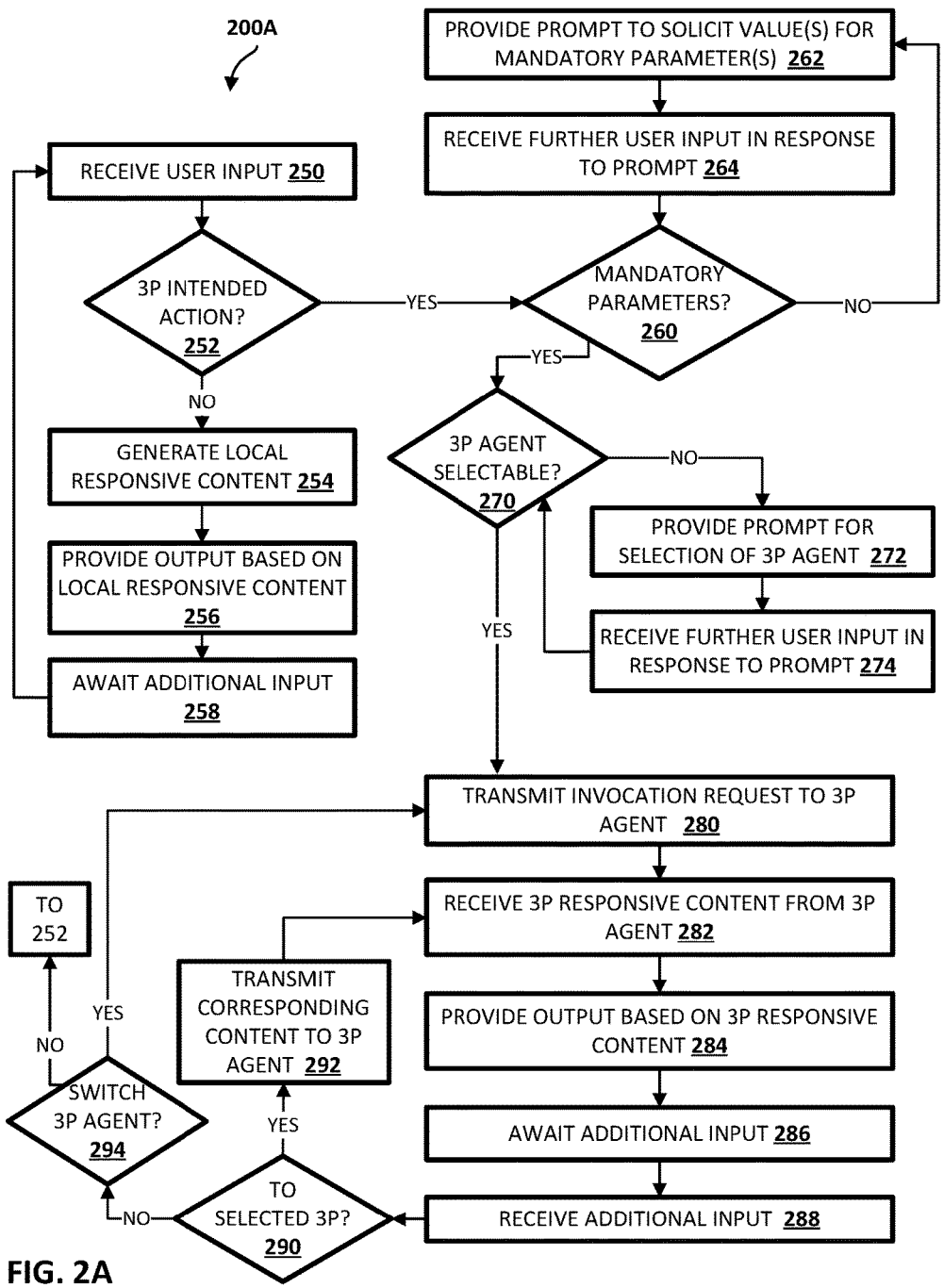
FIG. 2A is a flowchart illustrating an example method according to implementations disclosed herein.
Figure 2B:
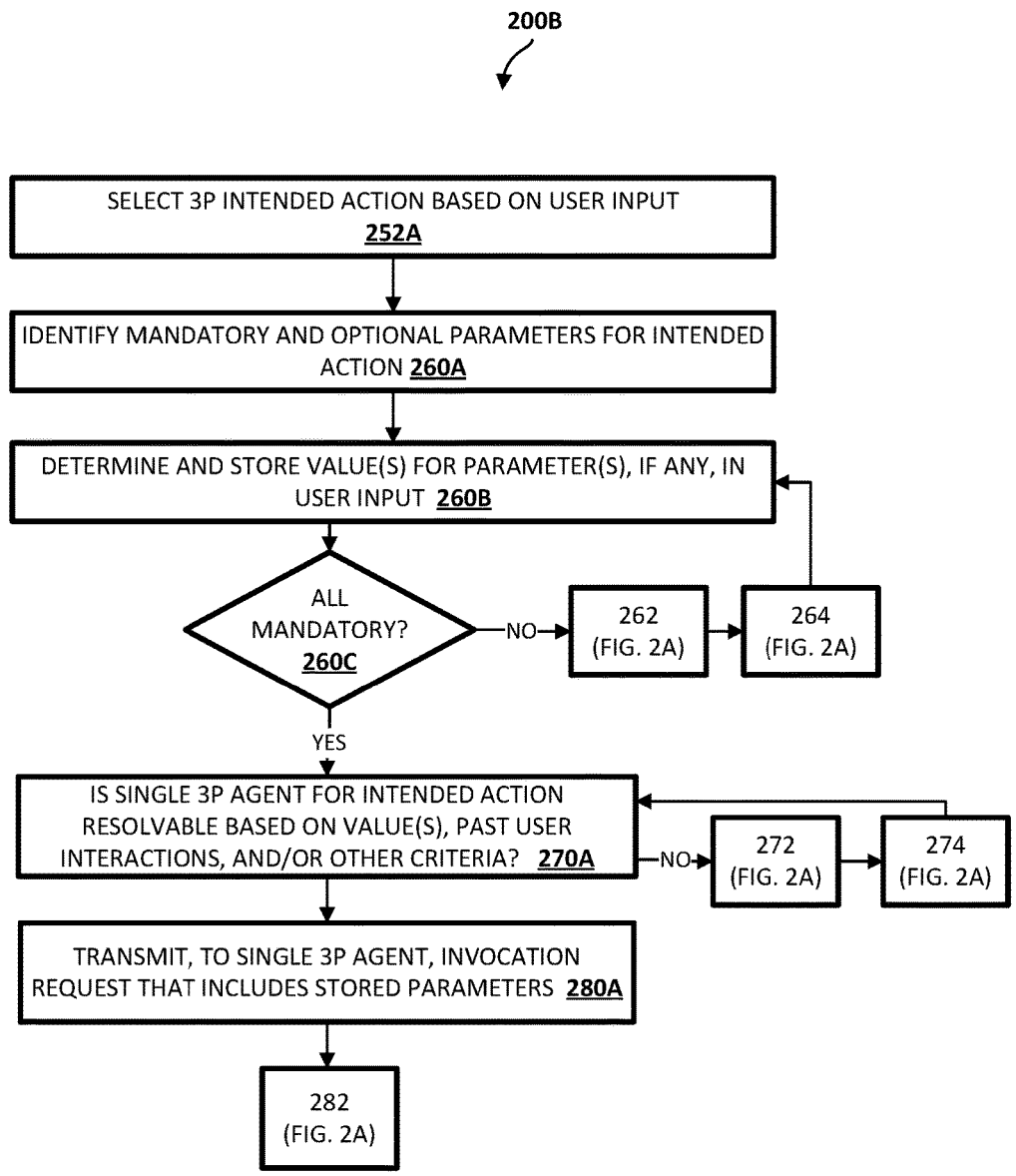
FIG. 2B is a flowchart illustrating some implementations of the blocks of the flowchart of FIG. 2A in more detail.
Figure 3:
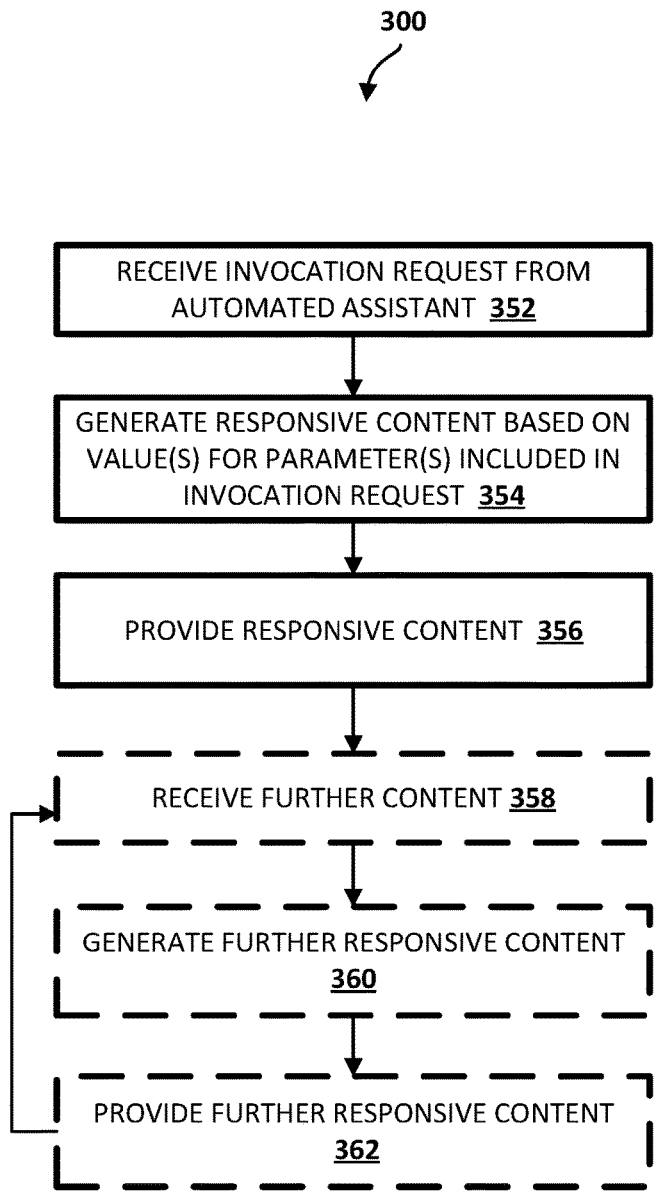
FIG. 3 is a flowchart illustrating an example method that may be performed by a third-party agent according to implementations disclosed herein.

Turning now to FIGS. 2A, 2B, and 3, examples of methods that may be performed by components of the environment of FIG. 1 are described.

FIG. 2A is a flowchart illustrating an example method 200A according to implementations disclosed herein. For convenience, the operations of the flow chart are described with reference to a system that performs the operations. This system may include various components of various computer systems, such as one or more components of automated assistant 110. Moreover, while operations of method 200 are shown in a particular order, this is not meant to be limiting. One or more operations may be reordered, omitted or added.

At block 250, the system receives user input. In some implementations, the user input received at block 250 is natural language input that is free-form. For example, the system may receive typed input in the form of text generated by a client device based on user input sensed by a physical or virtual keyboard of the client device. Also, for example, the system may receive voice input in the form of streaming audio data generated by a voice-enabled client device based on spoken input sensed by a transducer of the client device. In some of those examples, the system may optionally convert the voice input to text. For instance, a voice to text module of the system may convert the voice input to text using a voice to text model, such as a finite state decoding graph.

At block 252, the system determines whether the received user input indicates a third-party (3P) intended action. For example, the system may parse text of received natural language input (or text converted from received audio natural language input), and determine whether the parsed text maps to any 3P intended action. For instance, the system may determine whether the parsed text maps to any 3P intended action based on whether terms/phrases included in the text match terms/phrases stored in association with a 3P intended action. Also, for instance, the system may determine whether one or more entities derived from the text match one or more entities stored in association with a 3P intended action.

If the system determines at bock 252 that a 3P intended action is not indicated, the system proceeds to blocks 254, 256, and 258. At block 254 the system generates local responsive content without invocation of a third-party agent. For example, the system may generate the local responsive content utilizing local grammar models and/or local content models of the system. At block 256, the system provides output that is based on the local responsive content. For example, the output may be the local responsive content or a conversion (e.g., a text to speech conversion) of the local responsive content. The output is provided for presentation (e.g., audible or graphical) via the client device. At block 258, the system awaits additional voice input and proceeds back to block 250 upon receiving additional voice input.

If the system determines at an iteration of block 252 that a 3P intended action is indicated, the system proceeds to block 260. At block 260, the system determines whether value(s) have been resolved for all parameter(s) that are stored in association with the intended action as mandatory. At a first iteration of block 260, this involves determining whether the mandatory value(s) are indicated by the user input received at a most recent iteration of block 250 and/or one or more preceding iterations of block 250 (e.g., prior user input that provides value(s) but that did not yet indicate the intended action). Block 260 may also involve inferring value(s) for one or more mandatory parameters based on stored user preferences and/or other data. At further iteration(s) of block 260, further user input provided at block 264 (described below) will also be considered.

As one example of block 260, assume natural language input of "Purchase 2 adult tickets for that movie for tonight" was received in a most recent iteration of block 250, was preceded by natural language input of "Tell me about Movie A" in an immediately preceding iteration of block 250, and that blocks 254, 256, and 258 were invoked for the immediately preceding iteration of block 250 to provide local content about the fictional "Movie A". The 3P intended action of "buy movie ticket(s)" may have been determined at block 252 based on the natural language input of "Purchase 2 adult tickets for that movie for tonight". At block 260, the system may utilize that natural language input to determine a value of "2" for the mandatory parameter of "number of adult tickets". The system may also determine a value of "Movie A" (or associated identifier) for the mandatory parameter of "movie name" utilizing that natural language input and the preceding natural language input of the preceding iteration of block 250 (e.g., using co-reference resolution to resolve "that movie" to "Movie A"). The system may further determine that, for the 3P intended action of "buy movie ticket(s)", there is an additional mandatory parameter of "theater location"—and that a value for the "theatre location" mandatory parameter has not been resolved.

If the system determines at block 260 that value(s) have not been resolved for all mandatory parameter(s), the system proceeds to blocks 262 and 264. At block 262, the system provides, for presentation to the user, a prompt to solicit value(s) for one or more of the mandatory parameter(s) that have not been resolved. For example, and continuing with the example of the preceding paragraph, the system may generate a prompt of "what theatre" to solicit a value for the mandatory parameter of "theater location". At block 264, the system receives further user input in response to the prompt. For example, and continuing with the same example, the system may receive free-form natural language input of "Megaplex". The system then proceeds back to block 260. For example, at the next iteration of block 260 the system may resolve the input of "Megaplex" to a particular theatre location (e.g., based on the text and optionally a location of the user) and determine that all mandatory parameters have been resolved. It is understood that in some cases multiple iterations of blocks 260, 262, and 264 will be performed and that each iteration may involve prompting, receiving, and/or resolving value(s) associated with one or more corresponding mandatory parameters.

If the system determines at block 260 that value(s) have been resolved for all mandatory parameter(s), the system proceeds to block 270. At block 270, the system determines whether a particular 3P agent can be selected from a group of 3P agents that can each perform the intended action. In some implementations, the system may eliminate one or more 3P agents of the group from the selection based on comparing: value(s) for parameter(s) determined based on user input at one or more iterations of block 250 and/or block 264 to corresponding value(s) for the parameter(s) defined for each of the 3P agents that can perform the intended action. For example, for the mandatory parameter of "theatre location" the value of "Megaplex" may be determined and a given 3P agent may be eliminated from the selection based on a "theatre location" parameter for the given 3P agent not including the value of "Megaplex".

Although an example is provided with respect to a mandatory parameter, in many implementations the system may additionally or alternatively utilize one or more optional parameters defined for the intended action to eliminate one or more 3P agents. For example, optional parameters may be inferred based on stored user preferences and/or may be solicited in a prompt by the system and/or freely offered by the user via user input at one or more iterations of block 250 and/or block 264. For instance, assume a prompt at block 262 is "what theatre" (to solicit a value for the mandatory parameter of "theatre location") and the responsive user input at block 264 is "Megaplex—the 7:00 showing". Such responsive user input may be utilized to determine a value of "7:00" for an optional parameter of "movie time" even though it was not explicitly solicited. Further, at block 270 (and/or at block 280 described below), the optional parameter may be utilized. For example, at block 270 "7:00" may be utilized to eliminate a 3P agent that has a value for a "movie time" parameter indicating that it does not have inventory for that time for "Movie A" at "Megaplex".

Other criteria may additionally or alternatively be utilized at block 270 to determine whether a particular 3P agent can be selected from a group of 3P agents that can each perform the intended action. For example, where it is determined that multiple 3P agents can perform the intended action with the determined value(s) for parameter(s), the system may optionally select a single particular 3P agent based on one or more criteria. For example, the system may select the particular 3P agent based on the user previously implicitly or explicitly indicating a preference for the particular 3P agent over other available 3P agents. Also, for example, the system may additionally or alternatively select the particular 3P agent based on a rating of the particular 3P agent (e.g., based on feedback and/or usage by multiple users), based on a price of completing the intended action with the particular 3P agent, etc.

If the system determines at block 270 that a particular 3P agent cannot be selected, the system proceeds to block 272. At block 272, the system provides, for presentation to the user, a prompt that solicits the user to select a 3P agent from multiple options. The multiple options presented to the user include one or more of the "non-eliminated" 3P agents. In other words, one or more of the 3P agents that can perform the intended action with the particular determined value(s). As one example, the system may provide a prompt that presents the user with a choice between two or more of such 3P agents (e.g., "Do you want to use 3P Agent 1 or 3P Agent 2"). In some implementations, the system may additionally or alternatively include, in the prompt, value(s) that are specific to the presented 3P agents, and that have not been specified by the user, to help the user select. For example, instead of explicitly identifying each of multiple 3P agents, the prompt may only identify parameter values that differ between the multiple 3P agents (e.g., "One can do it for $15 by Monday and the other can do it for $12 by Tuesday, which one?"). Also, in some implementations, which 3P agents (of multiple 3P agents that can achieve the intended action with the determined value(s)) are actually selected for including in a prompt may be based on value(s) that are specific to those 3P agents, and that have not been specified by the user. For example, where a value for a price parameter hasn't been specified by the user it can be utilized to select two particular 3P agents for providing in the prompt over other available 3P agents that can also perform the intended action with the determined value(s).

At block 274, the system receives further user input in response to the prompt of block 272. The system then proceeds back to block 270 to determine whether a particular 3P agent can be selected taking into account the further user input. For example, at block 274 the system may receive free-form natural language input that directly (e.g., includes a name of) or indirectly (e.g., specifies a value of) indicates one of the 3P agents presented in the prompt of block 272. At block 270, the system may then select the indicated 3P agent based on it being indicated in the user input of block 274. In some cases multiple iterations of blocks 272 and 274 may be performed. For example, at a first iteration of block 272 the prompt may be "two 3P agents can pick you up in less than 10 minutes and estimate a cost of $15; another will pick you up in 20 minutes and estimates a cost of $10". In response, and at a first iteration of block 274, the user input may be "one of the less than 10 minutes" ones. At a next iteration of block 272 the prompt can then be "OK. 3P agent A has a rating of 4.0 and 3P Agent B has a rating of 3.9, which one?" In response, and at a second iteration of block 274, the user input may be "3P Agent B", which the system can utilize at block 270 to select "3P Agent B".

If the system determines at an iteration of block 270 that a particular 3P agent can be selected, the system may proceed to block 280. In some implementations, the system may, prior to proceeding to block 280, first prompt the user to confirm that the user desires to utilize the particular 3P agent (e.g., if iterations of block 272 and 274 weren't performed and/or the user hasn't otherwise indicated a desire to proceed). In those implementations, the system may require affirmative user input in response to the prompt prior to proceeding to block 280. In other implementations, the system may automatically proceed to block 280 without first prompting the user to confirm.

At block 280, the system transmits an invocation request to the 3P agent selected at block 270. For example, the system may transmit the invocation request over one or more networks and may optionally utilize an API. In some implementations, the invocation request includes value(s) for parameter(s) determined as described above. In some implementations, the invocation request also optionally includes the intended action (e.g., when the selected 3P agent can perform multiple intended actions).

At block 282, the system receives 3P responsive content from the 3P agent in response to transmitting the invocation request at block 280. For example, the system may receive the 3P responsive content over one or more network interfaces and may optionally utilize an API. The 3P responsive content is responsive to the invocation request and may be generated by the 3P agent utilizing its own semantic processing engines, its own semantic models, and/or other 3P agent specific component(s). In some implementations, the 3P responsive content is further based on the value(s) for the parameter(s) provided with the invocation request at block 280.

At block 284, the system provides output that is based on the 3P responsive content. For example, the output may be the 3P responsive content or a conversion (e.g., a text to speech conversion) of the 3P responsive content. The output is provided for presentation (e.g., audible or graphical) via the client device.

At block 286, the system awaits additional input from the user in response to the output provided at block 284.

At block 288 the system receives the additional input. For example, the system may receive additional input that is free-form natural language input.

At block 290, the system determines whether the received additional input is directed to the 3P agent invoked at a most recent iteration of block 280. If so, the system transmits corresponding content (e.g., the received additional input, a conversion thereof, and/or annotations thereof) to the 3P agent. The system then proceeds to another iteration of block 282 and receives, from the 3P agent, further responsive content that is responsive to the transmitting at block 292. Multiple iterations of blocks 282, 284, 286, 288, 290, and 292 may be performed to enable the user to effectively engage in a dialog with the 3P agent, while the automated assistant serves as an intermediary. As described herein, in some implementations the system may actually transfer the dialog to the 3P agent at block 280 and may return back to block 250 (and/or other block) once the dialog is transferred back to the system. In some of those implementations blocks 282, 284, 286, 288, 290, 292, and/or 294 may be omitted.

In some implementations, at block 290 the system may determine whether the received additional input is directed to the 3P agent based on the invocation request transmitted at block 280 and/or the 3P responsive content received at block 282. For example, at block 280 the system may transmit an invocation request with all mandatory parameters and/or that requests the 3P agent to perform the intended action without the 3P agent engaging in dialog. In such an example, the system may resultantly determine at block 290 that the additional input is not directed to the 3P agent. As another example, the 3P responsive content received at block 282 may indicate whether the 3P agent anticipates further voice input that is directed to the 3P agent. For example, the 3P responsive content may indicate whether it is an "ask"/"prompt" that requests further 3P agent related voice input (in which case further input that is directed to the 3P agent is anticipated) or, alternatively, is a "tell"/"resolution" that does not anticipate further 3P agent related voice input (in which case further input that is directed to the 3P agent is not anticipated).

In some implementations, even if the system is anticipating additional input that is directed to the selected 3P agent, depending on the actual input received at block 288, it may nonetheless determine that the additional input received is not directed to the 3P agent. For example, the system may determine that inputs such as "stop", "quit", "talk to another 3P agent", "different 3P agent", etc. are not directed to the selected 3P agent.

If, at block 290, the system determines the received additional input is not directed to the 3P agent, the system proceeds to block 294. At block 294, the system determines whether the received additional input indicates a desire to switch to a different 3P agent. If so, and if additional 3P agent(s) are available that can perform the intended action with determined value(s), the system may proceed to block 280 and transmit an invocation request to one of the additional 3P agents. The system may include the determined value(s) with the invocation request to the additional 3P agent at block 280. Moreover, in some implementations additional value(s) may have been determined during interaction with the 3P agent, and those value(s) also provided in the invocation request to the additional 3P agent. Which of multiple additional 3P agent(s) are selected for transmitting the additional invocation request may be based on the additional input itself (e.g., if it references one of the additional 3P agents by name or characteristic) and/or based on other factors (e.g., the next most popular 3P agent if the additional input is "next agent").

If, at block 294, the system determines the received additional input does not indicate a desire to switch to a different 3P agent, the system proceeds to block 252.

FIG. 2B is a flowchart illustrating an example 200B of some implementations of certain blocks of the method 200 of FIG. 2A. For convenience, the operations of the flow chart are described with reference to a system that performs the operations. This system may include various components of various computer systems, such as 3P agent engine 120 and/or one or more other components of automated assistant 110. Moreover, while operations of the example 200B are shown in a particular order, this is not meant to be limiting. One or more operations may be reordered, omitted or added.

Example 200B provides some particular examples of blocks 252, 260, 270, and 280 of FIG. 2A.

Block 252A of FIG. 2B is a particular example of block 252 of FIG. 2A. At block 252A, the system selects a 3P intended action based on user input.

Blocks 260A, 260B, and 2660C of FIG. 2B are a particular example of block 260 of FIG. 2A. At block 260A, the system identifies mandatory and optional parameters for the intended action selected at block 252A.

At block 260B, the system determines and stores the value(s) for parameter(s), if any, that are indicated in the user input received at block 252A.

At block 260C, the system determines whether all mandatory parameters for the intended action have been determined at the most recent iteration of block 260B. If they have not, the system proceeds to blocks 262 and 264 of FIG. 2A, then proceeds back to block 260B to determine and store parameters (if any) in further user input provided in block 264.

If, at an iteration of block 260C, all mandatory parameters for the intended action have been determined, the system proceeds to block 270A. At block 270A, the system determines whether a single 3P agent for the intended action is resolvable based on the value(s) determined and stored at one or more iterations of block 260B, past user interactions, and/or other criteria. If not, the system proceeds to blocks 272 and 274 of FIG. 2A, then proceeds back to block 270A to determine if further user input provided in block 274 enables resolution of a single 3P agent.

If, at an iteration of block 270A, a single 3P agent is resolvable, the system proceeds to block 280A. At block 280A, the system transmits, to the single 3P agent, an invocation request that includes the parameters determined and stored at one or more iterations of block 260B. The system then proceeds to block 282 of FIG. 2A.

FIG. 3 is a flowchart illustrating an example method 300 that may be performed by a third-party agent according to implementations disclosed herein. This system may include various components of various computer systems, such as one or more components of one of the 3P agents 140A-N. Moreover, while operations of method 300 are shown in a particular order, this is not meant to be limiting. One or more operations may be reordered, omitted or added.

At block 352, the system receives an invocation request from an automated assistant. The invocation request may include an intended action (e.g., when the system can perform multiple intended actions), value(s) for parameter(s) of the intended action, and/or other data. In some implementations, the invocation request may indicate that the system should effectively or actually take over the dialog. If the invocation request indicates that the system should actually take over the dialog, the system may establish a direct network communications session with a corresponding client device. If the invocation request indicates that the system should effectively take over the dialog, the system may take over the dialog while still communicating with the component that provided the invocation request and/or a related component.

At block 354, the system generates responsive content based on value(s) for parameter(s) that are included in the invocation request, such as values for mandatory and/or optional parameters.

At block 356, the system provides the responsive content. For example, where the invocation request indicates the system should effectively take over the dialog and/or should only perform an intended action without engaging in a dialog, the system may transmit the responsive content to the component (or related component) that sent the invocation request. Also, for example, where the invocation request indicates the system should actually take over the dialog, the system may transmit the responsive content to a corresponding client device.

At block 358, the system receives further content that is in reply to the responsive content provided at block 356. The further content may include, for example, user input provided in response to the responsive content, a conversion of that user input, and/or annotations of that user input. For example, where an automated assistant or other component serves as an intermediary, the automated assistant may provide a conversion of that user input and/or annotations of that user input.

At block 360, the system generates further responsive content based on the received further content of block 358.

At block 362, the system provides the further responsive content generated at block 360. The system may optionally then return to block 358 and perform an additional iteration of of blocks 358, 360, and 362. It is understood that in some implementations the system may perform multiple iterations of blocks 358, 360, and 362 while steering and engaging in a dialog. The system may exit the method 300 in response to satisfaction of one or more conditions (e.g., performance of the intended action) and may optionally transmit a communication to the component that provided the invocation request of block 352 to indicate that the system is exiting the method 300.

Blocks 358, 360, and 362 are illustrated in broken lines in FIG. 3 to indicate that they may not be performed in some situations. For example, as described herein in some implementations the system may perform an intended action in response to the invocation request of block 352, generate responsive content at block 354 that indicates an intended action has been performed, provide that responsive content at block 356, then not receive further content in association with that invocation request.

Figure 4:
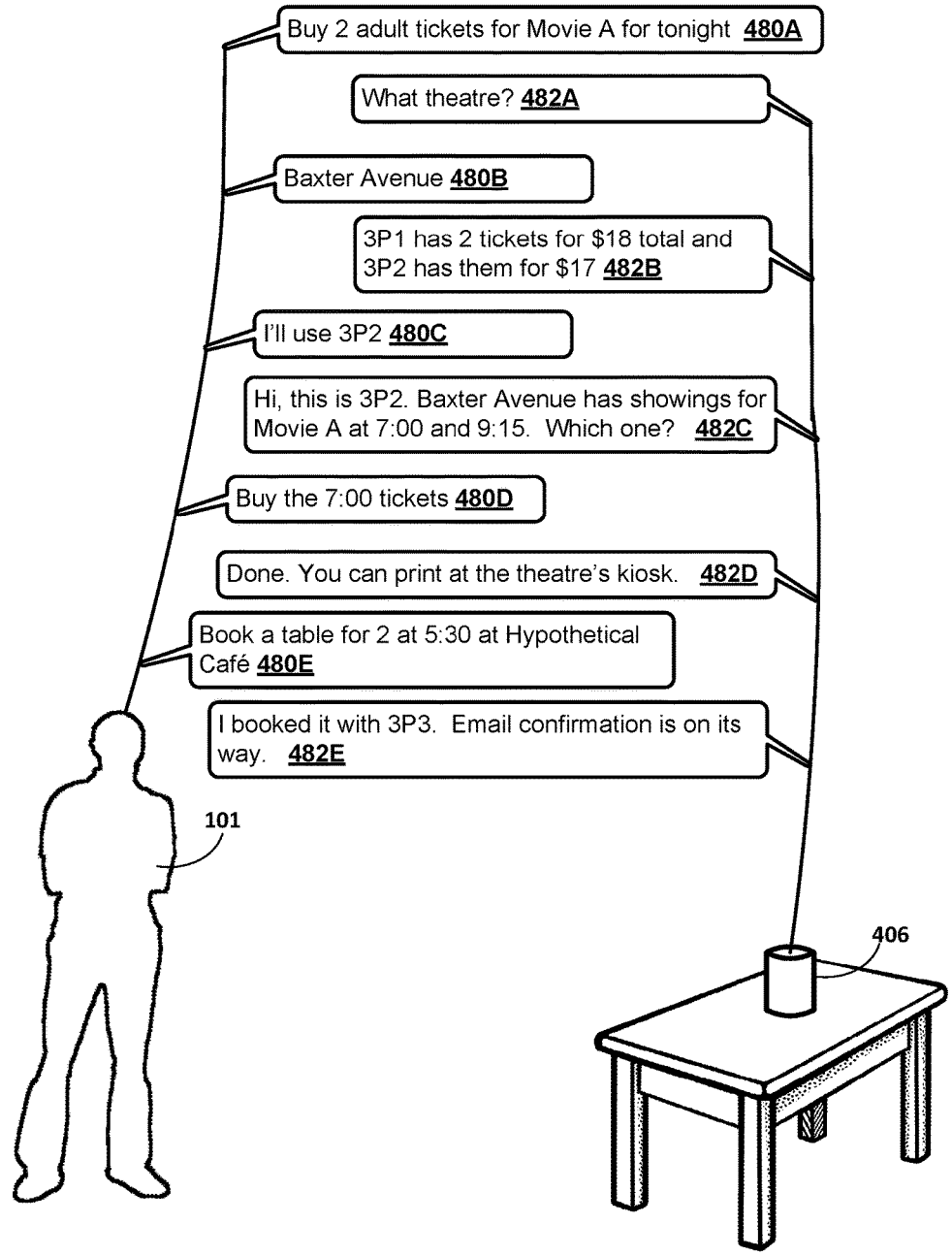
FIGS. 4, 5, and 6 each illustrate a user, a client device, and an example dialog between the user, an automated assistant associated with the client device, and a third-party agent, according to implementations disclosed herein.
Figure 5:
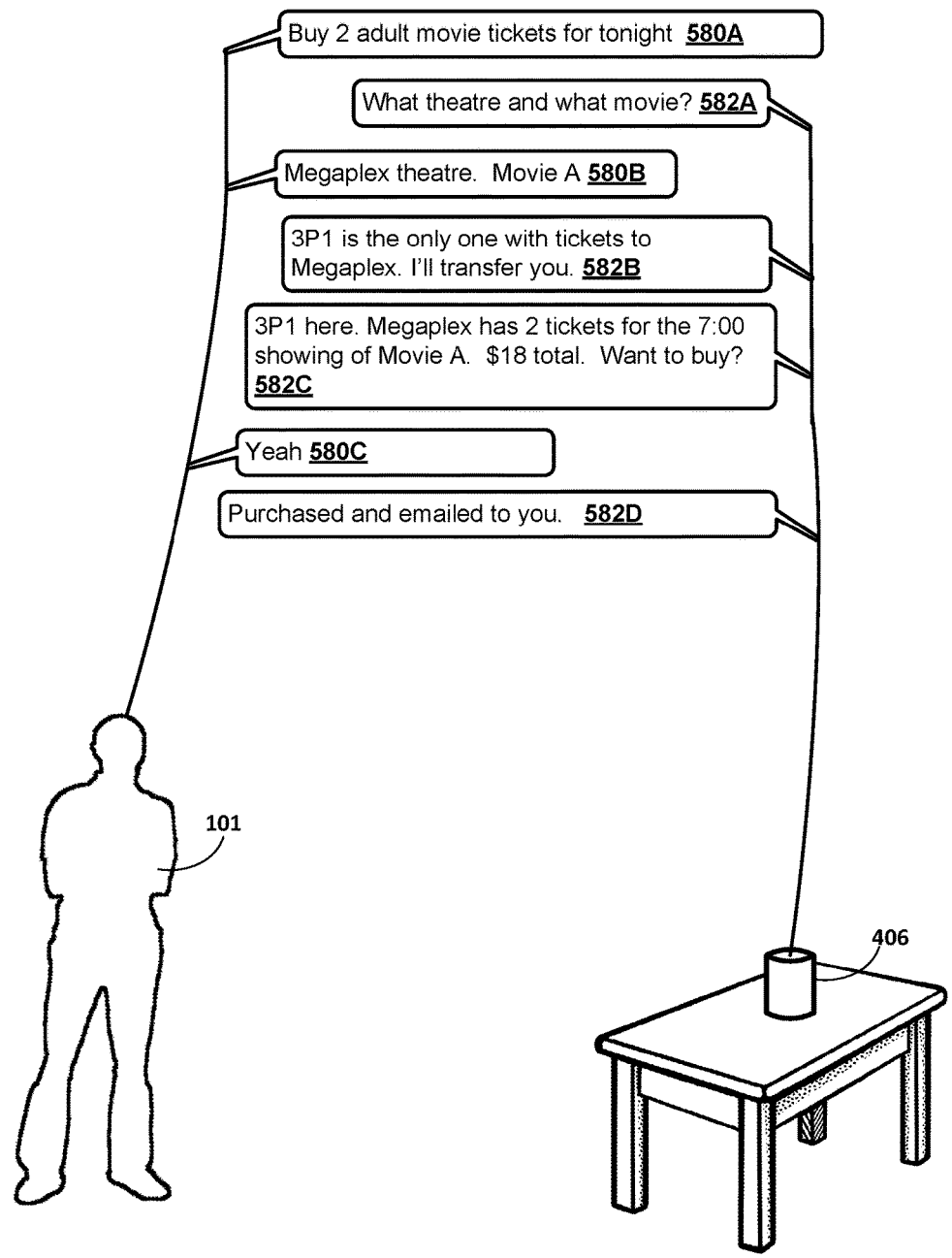
Figure 6:
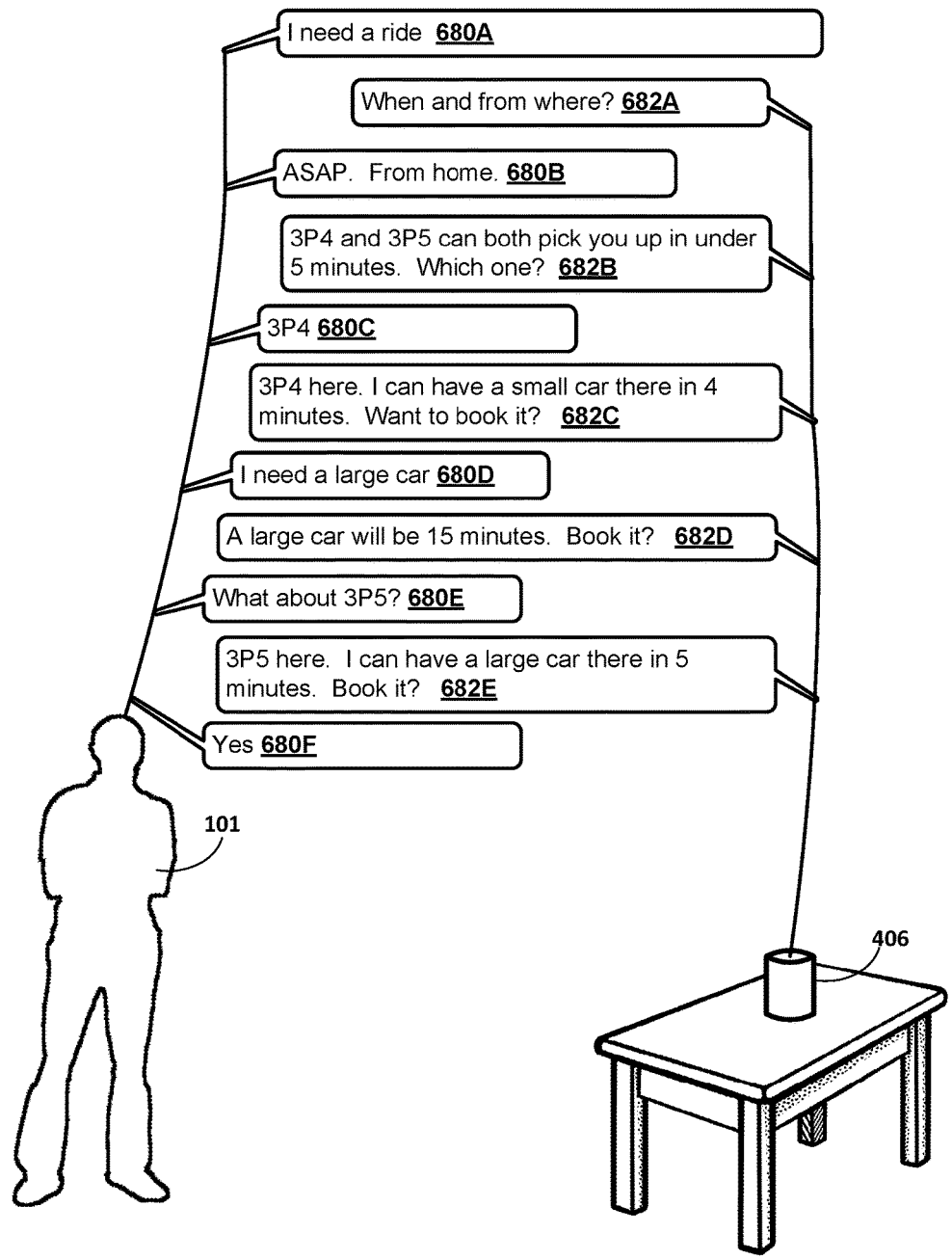

FIGS. 4, 5, and 6 each illustrates a user 101, a voice-enabled client device 406, and an example of dialog that may occur between the user 101, an automated assistant associated with the client device 406, and a third-party agent. The client device 406 includes one or more microphones and one or more speakers. One or more aspects of the automated assistant 110 of FIG. 1 may be implemented on the client device 406 and/or on one or more computing devices that are in network communication with the client device 406. Accordingly, for ease in explanation the automated assistant 110 is referenced in description of FIGS. 4, 5, and 6.

In FIG. 4, the user provides spoken input 480A of "Buy 2 adult tickets for Movie A for tonight". Voice input corresponding to the spoken input is generated by the device 606 and provided to the automated assistant 110 (e.g., as streaming voice input). The automated assistant 110 may convert the voice input to text, and determine that the text indicates an intended action of "buy movie ticket". The automated assistant 110 may further determine that the text indicates a value of "2" for the parameter of "number of adult tickets", and a value of "Movie A" (or associated identifier) for the parameter of "movie name".

The automated assistant 110 may further determine an additional mandatory parameter of "theater location" that is defined for the "buy movie ticket" intended action is not specified by the spoken input 480A. In response, the automated assistant 110 may generate and provide the prompt 482A "what theater" to solicit a value for the mandatory parameter.

In response to the responsive output 482A, the user provides further spoken input 480B of "Baxter Avenue". Voice input corresponding to the spoken input is generated by the device 606 and provided to the automated assistant 110. The automated assistant 110 may convert the voice input to text, and based on the text determine "Baxter Avenue Theater" (or associated identifier) as a value for the mandatory parameter of "theatre location".

The automated assistant 110 may further determine that two 3P agents ("3P1" and "3P2") are able to perform the "buy movie ticket" intended action with the values of "2", "Movie A", and "Baxter Avenue Theatre". In some implementations, the automated assistant 110 may select those from a larger group of 3P agents that can perform the "buy movie ticket" intended action based on the selected 3P agents being able to perform the intended action with the determined values, whereas others of the larger group cannot.

The automated assistant 110 further generates and provides the prompt 482B that identifies those selected 3P agents, as well as values for an additional unspecified parameter (price) for each of the 3P agents.

In response to the responsive output 482B, the user provides further spoken input 480C of "I'll use 3P2". Voice input corresponding to the spoken input is generated by the device 606 and provided to the automated assistant 110. The automated assistant 110 may convert the voice input to text, and based on the text determine 3P agent 3P2 is selected. The automated assistant 110 may then send an invocation request to 3P agent 3P2, along with determined values for parameters.

The 3P agent 3P2 then effectively or actually takes over (i.e., steers) the dialog and prompt 482C is provided based on responsive content generated by 3P agent 3P2. Prompt 482C may be provided directly by 3P agent 3P2 and/or via the automated assistant 110.

In response to the responsive output 482B, the user provides further spoken input 480C of "Buy the 7:00 tickets". Voice input corresponding to the spoken input is generated by the device 606 and provided to the automated assistant 110 (which then forwards it and/or a conversion to the 3P agent) and/or to the 3P agent 3P2 directly.

The 3P agent 3P2 generates further responsive content based on the spoken input 480D (and/or a conversion thereof) and responsive output 482D is provided based on that responsive content. Steering of the dialog is then returned to the automated assistant 110.

The user then provides spoken input 480E of "Book a table for 2 at 5:30 at Hypothetical Café". Voice input corresponding to the spoken input is generated by the device 606 and provided to the automated assistant 110. The automated assistant 110 may convert the voice input to text, and determine that the text indicates an intended action of "restaurant reservation". The automated assistant 110 may further determine that the text indicates all mandatory parameters for the intended action. Further, the automated assistant 110 may automatically select a particular 3P agent to invoke to perform the intended action with the parameters. For example, the particular 3P agent may be selected based on being the only 3P agent that can perform the intended action or based on user actions and/or input indicating that particular 3P agent as preferred for the intended action. In response to invocation, the particular 3P agent performs the intended action and transmits responsive content to the automated assistant 110 confirming the performance and/or other data. The automated assistant 110 then provides responsive output 482E that indicates the intended action was performed by the particular 3P agent and additional data provided by the 3P agent ("Email confirmation is on its way").

In FIG. 5, spoken input 580A is similar to spoken input 480A (FIG. 4), but also doesn't specify the mandatory parameter of "movie name". In response, the automated assistant provides a prompt 582A that solicits values for both the "theatre location" and "movie name" parameters.

The user then provides spoken input 580B that specifies values for both parameters. The automated assistant 110 determines that, of multiple "buy movie ticket" 3P agents, 3P agent 3P1 is the only one that can perform the intended action with the values determined based on the spoken inputs 580A and 580B. The automated assistant 110 provides output 582B indicating this and indicating that the user will be transferred to 3P agent 3P1. In other implementations, output 582B may not be provided and the user instead directly transferred to 3P agent 3P1.

The automated assistant 110 invokes 3P agent 3P1 with the determined values, and prompt 582C is provided based on responsive content from 3P agent 3P1. The spoken input 580C confirms that the user wants to purchase movie tickets from 3P agent 3P1. Output 582D is then provided based on responsive content from 3P agent 3P1 to confirm the purchase.

FIG. 6 illustrates spoken inputs 680A-F and responsive outputs 682A-E and a situation where a third party agent 3P4 is initially invoked and steers the dialog in outputs 682C and 682D. However, in response to the spoken input 680E that indicates a desire to switch to the other capable 3P agent 3P5, the automated assistant 110 intervenes and invokes 3P agent 3P5 while terminating 3P agent 3P4 from the dialog. Output 682E is then provided based on responsive content from 3P agent 3P5. It is noted that in invoking 3P agent 3P5, the automated assistant 110 provides values for parameters determined based on spoken inputs 680B and 680D. Accordingly, the 3P agent 3P 5 can generate responsive content that takes into account a value ("large car") for a parameter ("car size") determined during dialog steered by 3P agent 3P4. This may lead to an improved user experience and may lessen computational resources (e.g., that would otherwise be consumed if 3P agent 3P5 had to generate responsive content that prompted for a value for the "car size" parameter).

Figure 7:
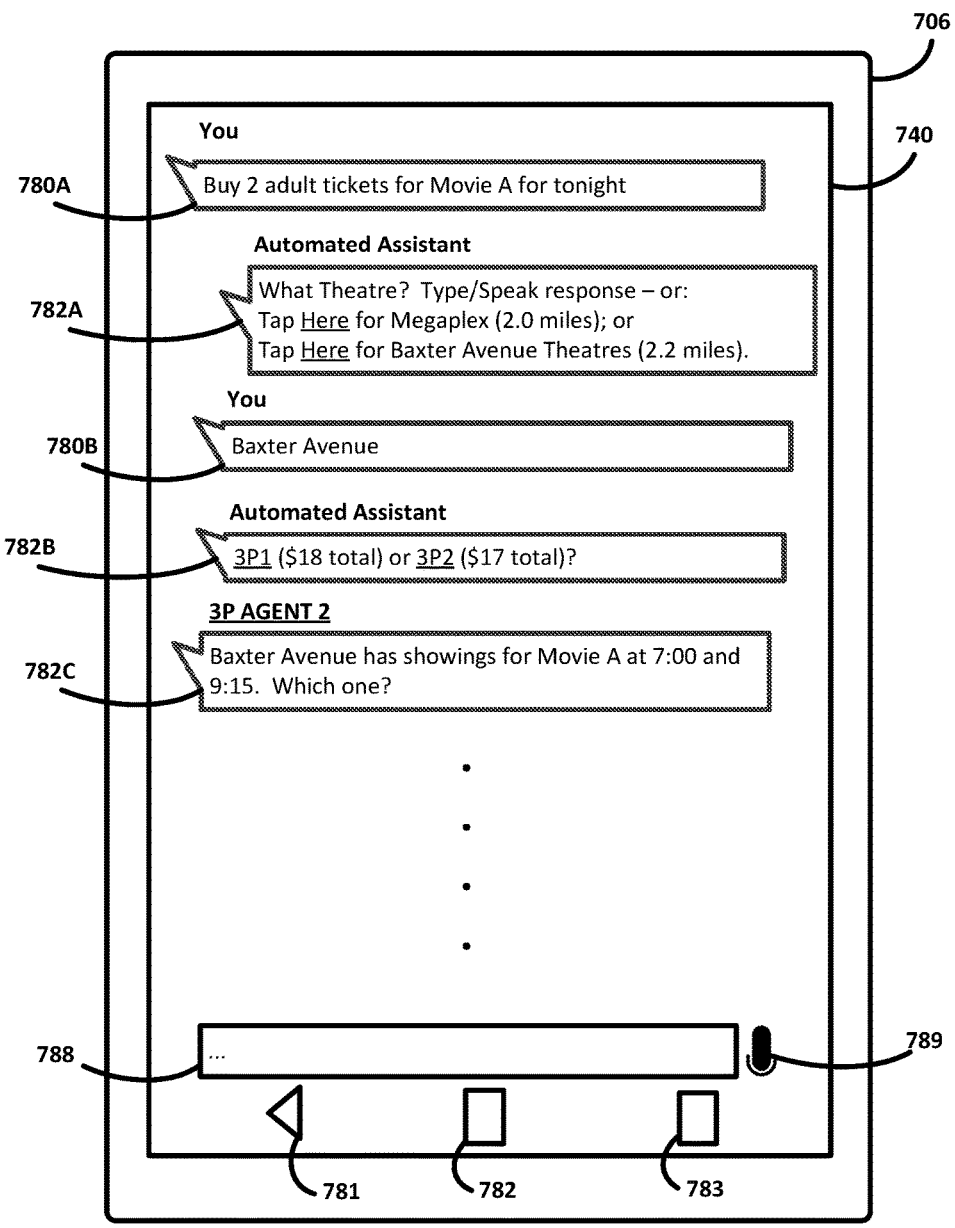
FIG. 7 illustrates an additional client device, and an example dialog between a user of the client device, an automated assistant associated with the client device, and a third-party agent, according to implementations disclosed herein.

FIG. 7 illustrates another client device 706 and a display screen 740 of the client device 706. The client device 706 may include and/or be in communication with the automated assistant 110. The display screen 740 includes a reply interface element 788 that the user may select to generate user input via a virtual keyboard and a voice reply interface element 789 that the user may select to generate user input via a microphone. In some implementations, the user may generate user input via the microphone without selection of the voice reply interface element 789. For example, during the dialog session, active monitoring for audible user interface input via the microphone may occur to obviate the need for the user to select the voice reply interface element 789. In some of those and/or in other implementations, the voice reply interface element 789 may be omitted. Moreover, in some implementations, the reply interface element 788 may additionally and/or alternatively be omitted (e.g., the user may only provide audible user interface input). The display screen 740 also includes system interface elements 781, 782, 783 that may be interacted with by the user to cause the client device 710 to perform one or more actions.

In FIG. 7, the dialog is similar to that of FIG. 4 and occurs via a common automated assistant interface as in FIG. 4 (although it is a different interface than that of FIG. 4). However, FIG. 7 illustrates some examples of how interactions may differ when different interfaces are used and/or different user interface input devices are available.

In FIG. 7, the user provides typed or spoken input 780A of "Buy 2 adult tickets for Movie A for tonight". Based on the input, the automated assistant 110 may determine an intended action of "buy movie ticket". The automated assistant 110 may further determine a value of "2" for the parameter of "number of adult tickets", and a value of "Movie A" (or associated identifier) for the parameter of "movie name".

The automated assistant 110 may further determine an additional mandatory parameter of "theater location" that is defined for the "buy movie ticket" intended action is not specified by the input 780A. In response, the automated assistant 110 may generate and provide the prompt 782A to solicit a value for the mandatory parameter. It is noted that in FIG. 7 the user may "tap" either of the underlined "Here" terms to select a corresponding theatre without providing further spoken or typed text input. However, the user instead provides spoken or typed input 780B of "Baxter Avenue".

Based on the input 780B, the automated assistant 110 may determine "Baxter Avenue Theater" (or associated identifier) as a value for the mandatory parameter of "theatre location". The automated assistant 110 may further determine that two 3P agents ("3P1" and "3P2") are able to perform the "buy movie ticket" intended action with the values of "2", "Movie A", and "Baxter Avenue Theatre".

The automated assistant 110 further generates and provides the prompt 782B that identifies those selected 3P agents, as well as values for an additional unspecified parameter (price) for each of the 3P agents. It is noted that in FIG. 7 the user may "tap" the underlined "3P1" to select the corresponding agent or may "tap" the underlined "3P2" to select the corresponding agent. The user may also optionally be able to provide spoken or typed input.

In the example of FIG. 7, the user taps the underlined "3P2". In response to the responsive "tap" input, the automated assistant selects 3P agent 3P2. The automated assistant 110 may then send an invocation request to 3P agent 3P2, along with determined values for parameters.

The 3P agent 3P2 then effectively or actually takes over the dialog and prompt 782C is provided based on responsive content generated by 3P agent 3P2. Prompt 782C may be provided directly by 3P agent 3P2 and/or via the automated assistant 110. The dialog may further continue as indicated by the ellipsis in FIG. 7.

Figure 8:
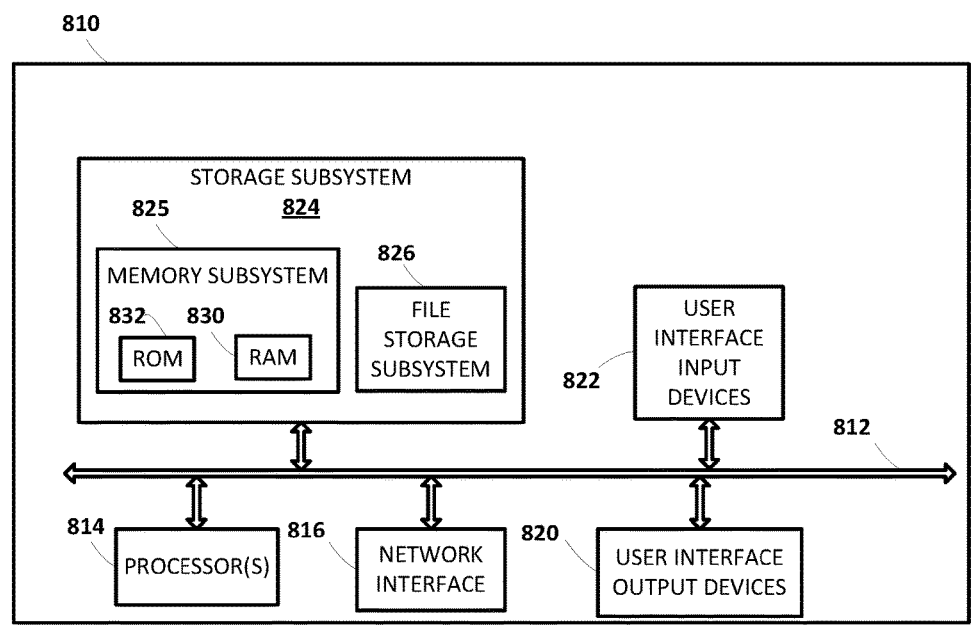
FIG. 8 illustrates an example architecture of a computing device.

FIG. 8 is a block diagram of an example computing device 810 that may optionally be utilized to perform one or more aspects of techniques described herein. In some implementations, one or more of device 106, automated assistant 110, a 3P agent, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method(s) of FIGS. 2A, 2B, and/or 3.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, comprising:
   receiving natural language input of a user that is directed to an automated assistant as part of a dynamic dialog between the user and the automated assistant, the natural language input being free-form and being based on user interface input provided by the user via a user interface input device;
   selecting an intended action based on determining that the natural language input indicates the intended action, the intended action being selected from a group of potential intended actions that are available via the automated assistant and that span multiple service sectors;
   determining that at least one mandatory parameter stored in association with the intended action is unspecified in the natural language input;
   in response to determining that the at least one mandatory parameter is unspecified, generating a prompt that is based on the at least one mandatory parameter;
   providing the prompt as part of the dynamic dialog and as a reply to the natural language input, the prompt being provided for presentation to the user via a user interface output device;
   receiving additional natural language input provided by the user as part of the dynamic dialog in response to the prompt, the additional natural language input being free-form;
   determining a value for the mandatory parameter based on the additional natural language input;
   determining an additional value for a non-solicited optional parameter of the intended action based on the natural language input or the additional natural language input;
   selecting a particular third-party agent from a group of third-party agents that can each perform the intended action indicated by the natural language input, wherein selecting the particular third-party agent from the group of third-party agents comprises:
      selecting the particular third-party agent based on the value and the additional value conforming to corresponding values defined, for the third-party agent, for the mandatory parameter and the non-solicited optional parameter, and
      eliminating an additional third-party agent from the selecting based on the value and the additional value not conforming to corresponding values defined, for the additional third-party agent, for the mandatory parameter and the non-solicited optional parameter, wherein the additional third-party agent is of the group of third-party agents;
   transmitting a third-party invocation request that includes the value for the mandatory parameter and that includes the additional value for the non-solicited optional parameter, wherein the transmitting is to the particular third-party agent via one or more network interfaces and occurs without any other third-party invocation request transmission to any other third-party agents of the group of third-party agents;
   receiving responsive content from the particular third-party agent in response to the transmitting the third-party invocation request, the receiving being via one or more of the network interfaces; and providing, for presentation to the user as part of the dynamic dialog, output that is based on the responsive content.

2. The method of claim 1, further comprising:
receiving further input provided by the user in response to the output that is based on the responsive content of the particular third-party agent; and
transmitting, to the particular third-party agent via one or more of the network interfaces, content that is based on the further input.

3. The method of claim 2, wherein the further input is voice input and further comprising:
converting the voice input to text;
wherein the content includes at least some of the text.

4. The method of claim 3, further comprising:
receiving, via one or more of the network interfaces, further responsive content from the particular third-party agent in response to transmitting the content; and
providing, for presentation to the user as part of the dynamic dialog, further output that is based on the further responsive content.

5. The method of claim 1, further comprising:
receiving further input provided by the user in response to the output that is based on the responsive content of the particular third-party agent;
determining whether the further input indicates a desire to cease interaction with the particular third-party agent; and
in response to determining that the further input does not indicate a desire to cease interaction with the particular third-party agent:
transmitting, to the particular third-party agent via one or more of the network interfaces, content that is based on the further input.

6. The method of claim 1, further comprising:
receiving further input provided by the user in response to the output or in response to further output that is based on content provided by the particular third-party agent;
determining that the further input indicates a desire to interact with another third-party agent; and
in response to determining that the further input indicates a desire to interact with another third-party agent:
transmitting, to an alternative third-party agent of the group of third party agents, an additional third-party invocation request that includes the value for the mandatory parameter.

7. The method of claim 6, further comprising:
determining a further value for an additional parameter of the intended action based on user input during engagement of the particular third-party agent in the dynamic dialog; and
including the further value for the additional parameter in the additional third-party invocation request.

8. The method of claim 1, wherein selecting the particular third-party agent occurs without providing the user with output that explicitly solicits the user to select between the particular third-party agent and one or more additional third-party agents of the group.

9. A method implemented by one or more processors, comprising:
as part of a dynamic dialog between a user and an automated assistant implemented by one or more of the processors:
receiving natural language input of a user that is directed to the automated assistant as part of the dynamic dialog, the natural language input being free-form and being based on user interface input provided by the user via a user interface input device;
selecting an intended action based on determining that the natural language input indicates the intended action, the intended action being selected from a group of potential intended actions that span multiple service sectors;
identifying a group of third-party agents that can each perform the intended action indicated by the natural language input and that can each perform the intended action;
generating a prompt that is based on a parameter that is stored in association with the intended action and that is unspecified in the natural language input, wherein the prompt does not explicitly identify any of the third-party agents of the group;
providing the prompt as part of the dynamic dialog and as a reply to the natural language input, the prompt being provided for presentation to the user via a user interface output device;
receiving additional natural language input provided by the user as part of the dynamic dialog in response to the prompt, the additional natural language input being free-form;
determining a value for the parameter based on the additional natural language input;
eliminating a third-party agent from the group of third-party agents to form a subgroup, the eliminating based on the value not conforming to a corresponding value defined for the parameter for the eliminated third-party agent;
selecting a particular third-party agent from the subgroup; and
transmitting a third-party invocation request that includes the value for the parameter, wherein the transmitting is to only the selected particular third-party agent via one or more network interfaces.

10. The method of claim 9, further comprising:
receiving responsive content from the particular third-party agent in response to the transmitting the third-party invocation request, the receiving being via one or more of the network interfaces; and
providing, for presentation to the user as part of the dynamic dialog, output that is based on the responsive content.

11. The method of claim 10, further comprising:
receiving further input provided by the user in response to the output that is based on the responsive content of the particular third-party agent; and
transmitting, to the particular third-party agent via one or more of the network interfaces, content that is based on the further input.

12. The method of claim 11, wherein the further input is voice input and further comprising:
converting the voice input to text;
wherein the content includes at least some of the text.

13. The method of claim 10, further comprising:
receiving further input provided by the user in response to the output or in response to further output that is based on content provided by the particular third-party agent;
determining that the further input indicates a desire to interact with another third-party agent; and
in response to determining that the further input indicates a desire to interact with another third-party agent:

transmitting, to an alternative third-party agent of the group of third party agents, an additional third-party invocation request that includes the value for the mandatory parameter.

14. A system comprising:

memory storing instructions;

one or more processors operable to execute the instructions stored in the memory to, as part of a dynamic dialog between a user and an automated assistant implemented by one or more of the processors:

receive natural language input of a user that is directed to the automated assistant as part of the dynamic dialog, the natural language input being free-form and being based on user interface input provided by the user via a user interface input device;

select an intended action based on determining that the natural language input indicates the intended action, the intended action being selected from a group of potential intended actions that span multiple service sectors;

identify a group of third-party agents that can each perform the intended action indicated by the natural language input and that can each perform the intended action;

generate a prompt that is based on a parameter that is stored in association with the intended action and that is unspecified in the natural language input, wherein the prompt does not explicitly identify any of the third-party agents of the group;

provide the prompt as part of the dynamic dialog and as a reply to the natural language input, the prompt being provided for presentation to the user via a user interface output device;

receive additional natural language input provided by the user as part of the dynamic dialog in response to the prompt, the additional natural language input being free-form;

determine a value for the parameter based on the additional natural language input;

eliminate a third-party agent from the group of third-party agents to form a subgroup, the eliminating based on the value not conforming to a corresponding value defined for the parameter for the eliminated third-party agent;

select a particular third-party agent from the subgroup; and transmit a third-party invocation request that includes the value for the parameter, wherein the transmitting is to only the selected particular third-party agent via one or inure network interfaces.

15. The system of claim 14, wherein one or more of the processors, in executing the instructions, are further to:

receive responsive content from the particular third-party agent in response to the transmitting the third-party invocation request, the receiving being via one or more of the network interfaces; and provide, for presentation to the user as part of the dynamic dialog, output that is based on the responsive content.

16. The system of claim 15, wherein one or more of the processors, in executing the instructions, are further to:

receive further input provided by the user in response to the output that is based on the responsive content of the particular third-party agent; and transmit, to the particular third-party agent via one or more of the network interfaces, content that is based on the further input.

17. The system of claim 16, wherein the further input is voice input and wherein one or more of the processors, in executing the instructions, are further to:

convert the voice input to text;

wherein the content includes at least some of the text.

18. The system of claim 14, wherein one or more of the processors, in executing the instructions, are further to:

receive further input provided by the user in response to the output or in response to further output that is based on content provided by the particular third-party agent;

determine that the further input indicates a desire to interact with another third-party agent; and in response to determining that the further input indicates a desire to interact with another third-party agent:

transmit, to an alternative third-party agent of the group of third party agents, an additional third-party invocation request that includes the value for the mandatory parameter.

* * * * *